US012429802B2

(12) United States Patent
Miyahara

(10) Patent No.: US 12,429,802 B2
(45) Date of Patent: Sep. 30, 2025

(54) ELECTROPHOTOGRAPHIC MEMBER, HEAT FIXING APPARATUS, AND ELECTROPHOTOGRAPHIC IMAGE FORMING APPARATUS

(71) Applicant: CANON KABUSHIKI KAISHA, Tokyo (JP)

(72) Inventor: Yasuhiro Miyahara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/778,575

(22) Filed: Jul. 19, 2024

(65) Prior Publication Data

US 2025/0036054 A1 Jan. 30, 2025

(30) Foreign Application Priority Data

Jul. 26, 2023 (JP) ................................ 2023-121745

(51) Int. Cl.
*G03G 15/20* (2006.01)

(52) U.S. Cl.
CPC ..... *G03G 15/2053* (2013.01); *G03G 15/2064* (2013.01); *G03G 2215/2009* (2013.01); *G03G 2215/2016* (2013.01)

(58) Field of Classification Search
CPC ............ G03G 15/2057; G03G 15/206; G03G 2215/2035
See application file for complete search history.

(56) References Cited

U.S. PATENT DOCUMENTS

| | | | | |
|---|---|---|---|---|
| 10,228,644 | B2 * | 3/2019 | Abe | G03G 15/2057 |
| 10,620,574 | B2 | 4/2020 | Kitano et al. | |
| 10,712,697 | B2 * | 7/2020 | Maeda | G03G 15/2057 |
| 10,890,869 | B2 | 1/2021 | Miyahara et al. | |
| 12,025,926 | B2 | 7/2024 | Miyahara et al. | |
| 2018/0217538 | A1 | 8/2018 | Abe et al. | |
| 2020/0371460 | A1 * | 11/2020 | Miyahara | G03G 15/2057 |

FOREIGN PATENT DOCUMENTS

| | | | |
|---|---|---|---|
| JP | 2005-300591 | A | 10/2005 |
| JP | 2019-211701 | A | 12/2019 |
| JP | 2019-215531 | A | 12/2019 |

OTHER PUBLICATIONS

Extended European Search Report in European Application No. 24190829.2 (Dec. 2024).

* cited by examiner

*Primary Examiner* — Jessica L Eley
(74) *Attorney, Agent, or Firm* — VENABLE LLP

(57) ABSTRACT

An electrophotographic member including a substrate, and an elastic layer on an outer peripheral surface of the substrate; wherein the elastic layer has silicone rubber, a tensile modulus of the elastic layer in a direction perpendicular to a thickness direction thereof is 0.20 MPa or less, a compressive modulus of the elastic layer in the thickness direction is 0.19 to 0.57 MPa, a value (tensile modulus/compressive modulus) of a ratio of the tensile modulus of the elastic layer in a direction perpendicular to the thickness direction, relative to the compressive modulus of the elastic layer in the thickness direction, is 0.80 or lower, and a rate of decrease of each of the compressive moduli of the samples from the elastic layer in a direction corresponding to the thickness direction of the elastic layer is 5% or lower.

10 Claims, 9 Drawing Sheets

ELECTROPHOTOGRAPHIC MEMBER, HEAT FIXING APPARATUS, AND ELECTROPHOTOGRAPHIC IMAGE FORMING APPARATUS

BACKGROUND OF THE INVENTION

Field of the Invention

The present disclosure relates to an electrophotographic member used in an electrophotographic image forming apparatus such as a copier or a printer, and to a heat fixing apparatus and an electrophotographic image forming apparatus that are provided with the electrophotographic member.

Description of the Related Art

In a heat fixing apparatus of an electrophotographic image forming apparatus, a pressure contact section is formed of a heating member and a pressing member disposed opposite the heating member. When a recording material (paper or the like) that holds an unfixed toner image is introduced into the pressure contact section, the unfixed toner becomes heated and pressed, whereby the toner melts and an image becomes fixed onto the recording material. The heating member is a member with which the unfixed toner image on the recording material comes into contact, and the pressing member is a member disposed opposite the heating member. A fixing member according to the present disclosure includes a heating member and a pressing member. The fixing member may have a rotatable shape, such as a roller shape or an endless belt shape. Such a fixing member includes a member having an elastic layer that contains, for instance, rubber such as crosslinked silicone rubber, and a filler, on a substrate formed of a metal or a heat-resistant resin.

As an object of achieving higher printing speeds and improving image quality, recent years have witnessed a demand for further improvements in the thermal conductivity, in the thickness direction, of elastic layers of fixing members. Japanese Patent Application Publication No. 2005-300591 discloses a fixing member in which a thermally-conductive filler contained in an elastic layer is formulated in a blend of a large-particle size filler and a small-particle size filler, to thereby increase thermal conductivity while suppressing increases in the hardness of the elastic layer.

Japanese Patent Application Publication No. 2019-215531 discloses a fixing member in which heat conduction paths are formed by arrangement small particle fillers present between the large particle filler particles in the thickness direction of an elastic layer, while curtailing the arrangement of large particle filler particles in the thickness direction of the elastic layer, so that, as a result, the thermal conductivity of the elastic layer in the thickness direction is increased while curtailing the content of the thermally-conductive filler.

SUMMARY OF THE INVENTION

Studies by the inventors have revealed that the fixing member according to Japanese Patent Application Publication No. 2005-300591 requires that the filler compounding amount relative to silicone rubber be 60 vol % or higher, in a case where the thermal conductivity of the elastic layer in the thickness direction exceeds 1.5 W/(m·K). It is therefore deemed that the invention of Japanese Patent Application Publication No. 2005-300591 hardly can provide a fixing member that exhibits yet higher thermal conductivity while suppressing increases in hardness.

The fixing member according to Japanese Patent Application Publication No. 2019-215531 allows further improvement of thermal conductivity in the thickness direction, while suppressing increases in the hardness of the elastic layer. With a view to further reducing the hardness of the elastic layer of the fixing member according to Japanese Patent Application Publication No. 2019-215531, the inventors produced, and assessed, a fixing member in which the degree of crosslinking of silicone rubber in the elastic layer had been reduced. Specifically, the inventors studied a fixing member, the elastic layer of which had a soft compressive modulus, in the thickness direction, of 0.19 to 0.57 MPa. As a result the inventors found that when that fixing member according to the above study was used for forming electrophotographic images over long periods of time, the elastic layer might break or undergo plastic deformation.

At least one aspect of the present disclosure is directed to providing a fixing member of low hardness and excellent durability. At least one aspect of the present disclosure is directed to providing a heat fixing apparatus that contributes to forming stably high-quality electrophotographic images. Further, at least one aspect of the present disclosure is directed to providing an electrophotographic image forming apparatus that allows stably forming high-quality electrophotographic images.

According to at least one aspect of the present disclosure, there is provided an electrophotographic member comprising:

a substrate, and an elastic layer on an outer peripheral surface of the substrate; wherein the elastic layer comprises silicone rubber, a tensile modulus of the elastic layer in a direction perpendicular to a thickness direction thereof is 0.20 MPa or less, a compressive modulus of the elastic layer in the thickness direction is 0.19 to 0.57 MPa, a value (tensile modulus/compressive modulus) of a ratio of the tensile modulus of the elastic layer in a direction perpendicular to the thickness direction, relative to the compressive modulus of the elastic layer in the thickness direction, is 0.80 or lower, and with compressive moduli H0 to H100 as respective values of compressive modulus of a cuboid sample 50 mm long, 50 mm wide and 150 μm thick that is sampled from the elastic layer, in a direction corresponding to the thickness direction of the elastic layer, every 10 hours, up to 100 hours, in an atmosphere at a temperature of 240° C. and at an oxygen concentration of 1% or lower, then a rate of decrease of each of the compressive moduli H10 to H100, relative to a compressive modulus H0 as a reference, is 5% or lower.

According to at least one aspect of the present disclosure, there is provided a fixing member of low hardness, and excellent durability. According to at least one aspect of the present disclosure, there is provided a heat fixing apparatus that contributes to forming stably high-quality electrophotographic images. According to at least one aspect of the present disclosure, there is provided an electrophotographic image forming apparatus capable of forming stably high-quality electrophotographic images.

Further features of the present invention will become apparent from the following description of exemplary embodiments with reference to the attached drawings.

DESCRIPTION OF THE EMBODIMENTS

Figure 1:
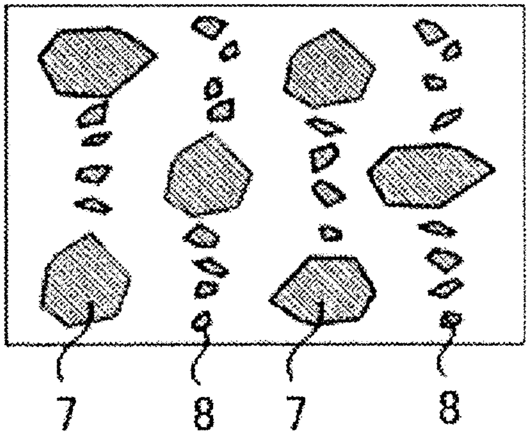
FIG. 1 is an arrangement of a thermally-conductive filler in an elastic layer of a fixing member according to one aspect of the present disclosure.

In the present disclosure, the descriptions of "XX or more and YY or less" or "XX to YY" representing numerical ranges mean numerical ranges including the lower and upper limits, which are endpoints, unless otherwise specified. When numerical ranges are stated stepwise, the upper and lower limits of each numerical range can be combined arbitrarily. In addition, in the present disclosure, wording such as "at least one selected from the group consisting of XX, YY and ZZ" means any of: XX; YY; ZZ; a combination of XX and YY; a combination of XX and ZZ; a combination of YY and ZZ; or a combination of XX and YY and ZZ.

The reference numerals in respective drawings are as follows.

1: core, 2: corona charging device, 3: substrate, 4: elastic layer, 5: adhesive layer, 6, surface layer, 7: large particle filler, 8: small particle filler, 100: fixing member, 201: front block, 202: rear block, 203: shield, 204: shield, 205: discharge wire, 206: grid, 401: sample, 401-1: first cross section, 401-2: second cross section, 11: fixing belt, 12: pressing belt, 13: induction heating member, 13*a*: induction coil, 13*b*: excitation core, 13*c*: coil holder, 14: excitation circuit, 15: temperature detection element, 16: control circuit section, 17: roller, 18: heating-side roller, 19: tension roller, 20: pressure-side roller, 21: fixing pad, 22: pressing pad, 23: sliding sheet, 24: sliding sheet, 25: separation member, 30: belt guide, 31: ceramic heater, 31*a*: heater substrate, 31*b*: heat generating layer, 31*c*: protective layer, 31*d*: sliding member, 32: stay, 33: pressing roller, 33*a*: metal core, 33*b*: elastic layer, 34: temperature detection element, N: fixing nip, t: toner image, S: recording medium, M:motor.

The elastic layer according to Japanese Patent Application Publication No. 2019-215531 has a thermally-conductive filler, in an elastic layer, set to exhibit a specific arrangement state in the thickness direction of the elastic layer, to thereby further increase the thermal conductivity while suppressing increases in the hardness of the elastic layer.

However, results of studies by the present inventors have revealed that arrangement the thermally-conductive filler in the thickness direction of the elastic layer may result in higher compressive hardness of the elastic layer in the thickness direction, as compared with that prior to arrangement of the thermally-conductive filler. That is conceivably because the above elicits the effect of suppressing deformation where heat conduction paths in the filler, which is a rigid body, resemble tension rods. In order to obtain an elastic layer of yet lower hardness relying on the art disclosed in Japanese Patent Application Publication No. 2019-215531, it has been effective to lower the tensile modulus of the silicone rubber in the elastic layer for instance down to or below 0.20 MPa or less.

In a fixing member in which the tensile modulus of silicone rubber in the elastic layer is 0.20 MPa or less, however, the elastic layer may break, or may suffer plastic deformation, when used for forming electrophotographic images over long periods of time. The present inventors surmise that the underlying cause of such breakage and plastic deformation is as follows. The crosslinked structure of the silicone rubber in the elastic layer breaks down over time, which gives rise to a so-called aging phenomenon whereby rubber elasticity drops gradually. It is commonplace to configure an elastic layer by adjusting H/Vi of addition-curable liquid silicone rubber used for forming an elastic layer, to allow residual unsaturated aliphatic groups to remain in the cured silicone rubber, so that, as a result, a crosslinked structure becomes reconstituted through reaction of these unsaturated aliphatic groups.

However, reconstitution of the crosslinked structure takes a longer time than cutting of the crosslinked structure. Therefore, when the elastic layer is set in particular in a high-temperature environment, there is first a decrease in hardness derived from cutting of the crosslinked structure of the silicone rubber, followed by reconstitution of the crosslinked structure, whereby the hardness having once dropped rises again. The phenomenon whereby hardness decreases prior to reconstitution of the crosslinked structure will also be referred to hereafter as "initial drop in hardness".

In a case where the hardness of the elastic layer is originally low prior to exposure to a high-temperature environment, the hardness of the elastic layer further decreases on account of the initial drop in the hardness of the elastic layer. It is considered that the elastic layer, the hardness whereof has further dropped, fails to withstand repeated compression that acts thereon during a fixing process, and thus breakage or plastic deformation occurs.

Therefore, the present inventors assiduously studied how to obtain a fixing member such that no breakage or plastic deformation of the elastic layer occurs with usage, also in a case where the hardness of the silicone rubber in the elastic layer has been further lowered. As a result the present inventors found that by causing an elastic layer in which the hardness of a silicone rubber has been lowered to undergo beforehand an initial hardness reduction process, such that the elastic layer is used after the silicone rubber in the elastic layer has been caused to switch from a process in which cutting of the crosslinked structure of the silicone rubber dominates over to a process in which reconstitution of the crosslinked structure dominates, it becomes possible to achieve an elastic layer that, while pliable, does not break or suffer plastic deformation even upon repeated formation of electrophotographic images.

Such an elastic layer can be achieved in by virtue of a feature wherein with compressive moduli H0 to H100 as respective values of compressive modulus of a cuboid sample 50 mm long, 50 mm wide and 150 μm thick that is sampled from the elastic layer, in a direction corresponding to the thickness direction of the elastic layer, every 10 hours, up to 100 hours, in an atmosphere at a temperature of 240° C. and at an oxygen concentration of 1 vol % or lower, then a rate of decrease of each of the compressive moduli H10 to H100, relative to a compressive modulus H0 as a reference, is 5% or lower.

That is, in a measurement of the compressive modulus of the elastic layer every 10 hours, up to 100 hours, in a heating fixing step, in an environment at which the silicone rubber in the elastic layer of the fixing member is exposed (environment at a high temperature of temperature of 240° C. and to which supply of oxygen has been virtually cut off), the elastic layer having already undergone a step of initial reduction of hardness exhibits a very small rate of change of compressive modulus between consecutive hours. Specifically, the rate of change is 5% or less.

The fixing member according to one aspect of the present disclosure has a substrate, and an elastic layer on an outer peripheral surface of the substrate, wherein the elastic layer contains silicone rubber. The tensile modulus of the elastic layer in a direction perpendicular to the thickness direction is 0.20 MPa or less, and the compressive modulus of the elastic layer in the thickness direction is from 0.19 to 0.57 MPa.

A value (tensile modulus/compressive modulus) of a ratio of the tensile modulus of the elastic layer in a direction perpendicular to the thickness direction, relative to the compressive modulus of the elastic layer in the thickness direction, is 0.80 or lower.

With compressive moduli H0 to H100 as respective values of compressive modulus of a cuboid sample 50 mm long, 50 mm wide and 150 μm thick that is sampled every 10 hours, up to 100 hours, from the elastic layer, in a direction corresponding to the thickness direction of the elastic layer, in an atmosphere at a temperature of 240° C. and at an oxygen concentration of 1 vol % or lower, then a rate of decrease of each of the compressive moduli H10 to H100, relative to a compressive modulus H0 as a reference, is 5% or lower.

The fact that the tensile modulus of the elastic layer in a direction perpendicular to the thickness direction is 0.20 MPa or less signifies that the silicone rubber interposed between the thermally-conductive filler particles in the elastic layer has low hardness.

The fact that the compressive modulus of the elastic layer in the thickness direction is 0.19 to 0.57 MPa signifies that although the thermally-conductive filler is arranged in the thickness direction in the elastic layer, the elastic layer as a whole is however pliable. This provision signifies that sufficient softness is maintained also when the elastic layer is compressed through interposition of silicone rubber between thermally-conductive filler particles arranged in the thickness direction of the elastic layer.

The fact that the value (tensile modulus/compressive modulus) of a ratio of the tensile modulus of the elastic layer in a direction perpendicular to the thickness direction, relative to the compressive modulus of the elastic layer in the thickness direction, is 0.80 or lower, signifies that the thermally-conductive filler in the elastic layer is arranged in the thickness direction of the elastic layer.

The fact that with compressive moduli H0 to H100 as respective values of compressive modulus of a cuboid sample 50 mm long, 50 mm wide and 150 μm thick that is sampled from the elastic layer, in a direction corresponding to the thickness direction of the elastic layer, every 10 hours, up to 100 hours, in an atmosphere at a temperature of 240° C. and at an oxygen concentration of 1 vol % or lower, then a rate of decrease of each of the compressive moduli H10 to H100, relative to a compressive modulus H0 as a reference, is 5% or lower, signifies, as pointed out above, that the crosslinked structure of the silicone rubber in the elastic layer has already undergone an initial drop in hardness.

An electrophotographic member according to an embodiment of the present disclosure will be explained in detail below on the basis of a concrete configuration.

(1) Outline of the Configuration of an Electrophotographic Member

The electrophotographic member in at least one aspect of the present disclosure is for instance a fixing member. The electrophotographic member may be a pressing member such as a pressing belt or a pressing roller. The above will be explained in detail with reference to accompanying drawings.

Figure 2A:
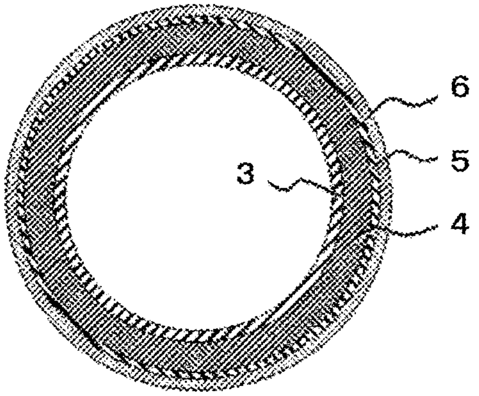
FIG. 2A is a schematic cross-sectional diagram of a fixing belt.
Figure 2B:
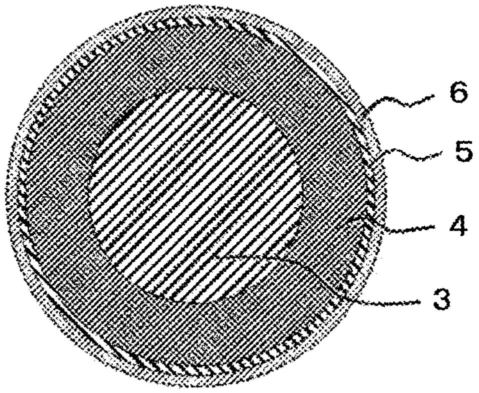
FIG. 2B is a schematic cross-sectional diagram of a fixing roller.

FIG. 2A and FIG. 2B are cross-sectional schematic diagrams illustrating a fixing member according to the present embodiment. FIG. 2A illustrates an example of the fixing member in the form of a belt, while FIG. 2B illustrates an example of the fixing member in the form of a roller. In FIG. 2A and FIG. 2B the reference numeral 3 denotes a substrate, and the reference numeral 4 denotes an elastic layer containing silicone rubber and that covers the outer peripheral surface of the substrate 3. In FIG. 2A and FIG. 2B the radial direction is the thickness direction of the elastic layer.

As described above, the fixing member according to the present embodiment includes the substrate 3, and the elastic layer 4 containing silicone rubber, on the substrate 3. As illustrated in the figures, the fixing member can have a surface layer 6 on the elastic layer 4 containing silicone rubber. An adhesive layer 5 may be provided between the elastic layer 4 containing silicone rubber and the surface layer 6; in such a case, the surface layer 6 is fixed, to the outer peripheral surface of the elastic layer 4 containing silicone rubber, by the adhesive layer 5. The fixing members illustrated in FIG. 2A and FIG. 2B both have an endless shape. The endless shape denotes a shape that allows a same portion to pass through a fixing nip repeatedly (endlessly) as a result of rotational motion in the circumferential direction.

(2) Substrate

When the fixing member is in the form of a belt such as that illustrated in FIG. 2A, a metal such as an electroformed nickel sleeve or a stainless steel sleeve, or a heat-resistant resin such as polyimide, can be used in the substrate 3. In a case in particular where the heat fixing apparatus relies on an electromagnetic induction heating scheme there is used an alloy containing nickel or iron as a main component, from the viewpoint of heat generation efficiency. A layer for improving adhesiveness with the elastic layer can be provided on the outer surface of the substrate 3 (surface on the elastic layer side). That is, it suffices that the elastic layer 4 be provided on the side of the outer peripheral surface of the substrate 3, but another layer may also be provided between the elastic layer 4 and the substrate 3. A layer for imparting functions such as wear resistance and lubricity can be further provided on the inner surface of the substrate 3 (surface on the opposite side to the outer surface). In a case where the substrate 3 it is in the form of a belt, a core is inserted into a sleeve in the course of a below-described production process.

In a case where the fixing member is in the form of a roller such as that illustrated in FIG. 2B, a metal core made up of metal or alloy, for instance of aluminum or iron, can be used in the substrate 3, so long as the metal core has enough strength as to withstand heating and pressure in the heat fixing apparatus. In FIG. 2B a solid metal core is used as the substrate 3; however, the substrate 3 may be a hollow metal core, and may have, in the interior thereof, a heat source such as a halogen lamp.

(3-1) Elastic Layer

The elastic layer is a layer for imparting flexibility to the electrophotographic member in order to secure a fixing nip in the heat fixing apparatus. In a case where the electrophotographic member is used as a heating member that comes into contact with toner on paper, the elastic layer also functions as a layer for imparting flexibility to the surface of the member, so that the surface can conform to paper unevenness. The elastic layer includes rubber as a matrix, and a thermally-conductive filler dispersed in the rubber. More specifically, for instance the elastic layer contains silicone rubber and a thermally-conductive filler, and is made up of a cured product resulting from curing a composition (hereafter silicone rubber composition) that contains at least a starting material (for instance a base polymer and a crosslinking agent) of silicone rubber, and a thermally-conductive filler.

When the silicone rubber composition is a liquid, preferably the thermally-conductive filler is readily dispersed, since in that case the elasticity of the elastic layer to be produced can be readily adjusted by adjusting the degree of crosslinking of the thermally-conductive filler depending on the type and the amount thereof. In addition, silicone rubber is preferably electrically insulating or semiconductive, for the purpose of imparting orientation to the filler through charging of the surface prior to curing of the below-described electric field-oriented rubber; for instance, a cured silicone polymer can be used, as described below.

The matrix has the function of eliciting elasticity in the elastic layer. The matrix of the elastic layer according to the present embodiment contains silicone rubber, from the viewpoint of bringing out the above functionality of the elastic layer. Silicone rubber is preferred herein by virtue of exhibiting high heat resistance that allows preserving flexibility even in environments in which the rubber reaches a high temperature of about 240° C., in a non-paper passing area. For instance a cured product of a below-described addition-curable silicone rubber composition can be used as the silicone rubber.

The silicone rubber mixture usually includes at least the following components (a) to (c), and includes the following component (d) as a given component:

- component (a): a linear organopolysiloxane having an unsaturated aliphatic group;
- component (b): an organopolysiloxane having active hydrogen bonded with silicon;
- component (c): a catalyst; and
- component (d): a thermally-conductive filler.

Each component will be described below.

Component (a): Linear Organopolysiloxane Having an Unsaturated Aliphatic Group

An linear organopolysiloxane having an unsaturated aliphatic group is an organopolysiloxane having an unsaturated aliphatic group such as a vinyl group, and having a linear structure of siloxane bonds. Examples thereof include at least one selected from the group consisting of compounds represented by the following formulas (1) and (2).

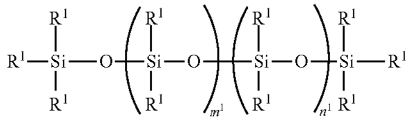

(2)

In formula (1), $m^1$ represents an integer of 0 or more (preferably 500 to 1100), and $n^1$ represents an integer of 3 or more (preferably 10 to 40). Further, in formula (1), each $R^1$ independently represents a monovalent unsubstituted or substituted hydrocarbon group containing no unsaturated aliphatic group, provided that at least one of $R^1$ represents a methyl group and each $R^2$ independently represents an unsaturated aliphatic group.

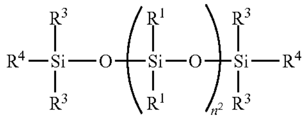

(2)

In formula (2), $n^2$ represents an integer of 1 or more (preferably 500 to 1100), and each $R^3$ independently represents a monovalent unsubstituted or substituted hydrocarbon group containing no unsaturated aliphatic group, provided that at least one of $R^3$ represents a methyl group, and each $R^4$ independently represents an unsaturated aliphatic group.

In formulas (1) and (2), examples of the monovalent unsubstituted or substituted hydrocarbon group containing no unsaturated aliphatic group, which can be represented by $R^1$ and $R^3$, include the following groups.

Unsubstituted Hydrocarbon Group

Alkyl group (for example, methyl group, ethyl group, propyl group, butyl group, pentyl group, and hexyl group).

Aryl group (for example, phenyl group).

Substituted Hydrocarbon Group

Substituted alkyl group (for example, chloromethyl group, 3-chloropropyl group, 3,3,3-trifluoropropyl group, 3-cyanopropyl group, and 3-methoxypropyl group).

The organopolysiloxanes represented by formulas (1) and (2) have at least one methyl group directly bonded to the silicon atom forming the chain structure. However, 50% or more of each of $R^1$ and $R^3$ are preferably methyl groups, and more preferably all $R^1$ and $R^3$ are methyl groups, for ease of synthesis and handling.

Also, examples of unsaturated aliphatic groups that can be represented by $R^2$ and $R^4$ in formulas (1) and (2) include the following groups. Examples of unsaturated aliphatic groups include a vinyl group, an allyl group, a 3-butenyl group, a 4-pentenyl group, and a 5-hexenyl group. Among these groups, both $R^2$ and $R^4$ are preferably vinyl groups because synthesis and handling are facilitated, cost is reduced, and a cross-linking reaction can be easily performed.

From the viewpoint of moldability, the viscosity of component (a) is preferably from 1000 $mm^2/s$ to 20000 $mm^2/s$, more preferably from 3000 $mm^2/s$ to 8000 $mm^2/s$. When the above viscosity is 1000 $mm^2/s$ or higher, the elastic layer can be adjusted to the required hardness, whereas when the viscosity is 20000 $mm^2/s$ or lower, the filler is readily oriented by an electric field. Viscosity (kinematic viscosity) can be measured using for instance a capillary viscometer or a rotational viscometer, according to JIS Z 8803:2011.

The compounding amount of component (a) is preferably 55 vol % or higher, from the viewpoint of durability, and 65 vol % or lower, from the viewpoint of heat conductivity, relative to the silicone rubber composition used for forming the elastic layer.

Component (b): Organopolysiloxane Having Silicon-Bonded Active Hydrogen

The organopolysiloxane having silicon-bonded active hydrogen, which reacts with an unsaturated aliphatic group of component (a) under the action of a catalyst, functions as a crosslinking agent for forming cured silicone rubber.

Any organopolysiloxane having a Si—H bond can be used as the component (b). In particular, from the viewpoint of reactivity with the unsaturated aliphatic group of component (a), an organopolysiloxane having an average number of silicon-bonded hydrogen atoms of 3 or more per molecule is preferably used.

Specific examples of component (b) include linear organopolysiloxane represented by formula (3) below and cyclic organopolysiloxane represented by formula (4) below.

(3)

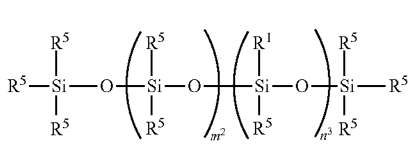

In formula (3), $m^2$ represents an integer of 0 or more (preferably 10 to 30), $n^3$ represents an integer of 3 or more (preferably 5 to 20), and $R^5$ each independently represents a monovalent unsubstituted or substituted hydrocarbon group containing no unsaturated aliphatic group.

(4)

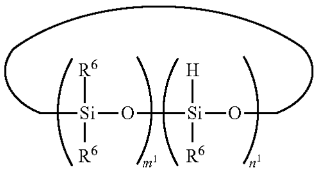

In formula (4), $m^3$ represents an integer of 0 or more (preferably 10 to 30), $n^4$ represents an integer of 3 or more (preferably 5 to 20), and $R^6$ each independently represents a monovalent unsubstituted or substituted hydrocarbon group containing no unsaturated aliphatic group.

Examples of monovalent unsubstituted or substituted hydrocarbon groups containing no unsaturated aliphatic group that can be represented by $R^5$ and $R^6$ in formulas (3) and (4) include the same groups as those mentioned above for $R^1$ in formula (1). Among these, it is preferable that 50% or more of each of $R^5$ and $R^6$ be a methyl group and more preferably all $R^5$ and $R^6$ are methyl groups because synthesis and handling are easy and excellent heat resistance is easily obtained.

Component (c): Catalyst

Examples of the catalyst used to form the silicone rubber include a hydrosilylation catalyst for accelerating the curing reaction. Known substances such as platinum compounds and rhodium compounds can be used as hydrosilylation catalysts. The blending amount of the catalyst can be appropriately set and is not particularly limited.

Component (d): Thermally-Conductive Filler

The thermally-conductive filler is selected taking into consideration the thermal conductivity, specific heat capacity, density, particle size, relative permittivity and so forth of the filler itself. The following thermally-conductive fillers such as inorganic materials, in particular metals, metal compounds and the like can be used as the thermally-conductive filler, for the purpose of enhancing the heat transfer characteristics. Silicon carbide, silicon nitride, boron nitride, aluminum nitride, alumina, zinc oxide, magnesium oxide, silica, copper, aluminum, silver, iron, nickel, metallic silicon and carbon fibers.

From the viewpoint of the thermal conductivity, electrical resistance value and relative permittivity of the filler itself there is used more preferably at least one filler selected from the group consisting of alumina, zinc oxide, metallic silicon, silicon carbide, boron nitride and magnesium oxide. Metallic silicon, silicon carbide and the like, which contain fewer ionic impurities (such as $Na^+$) in the filler, are more preferable herein from the viewpoint of heat resistance of the elastic layer.

The filler may be subjected to a surface treatment, from the viewpoint of affinity to silicone and in terms of electrical resistance value. Specifically, a filler such as alumina, silica or magnesium oxide, having active groups such as hydroxyl groups on the surface, may be surface-treated for instance with a silane coupling agent with hexamethyldisilazane. A metallic filler may be surface-treated through formation of an oxide film.

Furthermore, the electrical resistance value may be adjusted throughout the silicone rubber composition. The electrical resistance value of the entire composition can also be adjusted, even in the case of a filler having a comparatively low electrical resistance value, by using concomitantly a second filler of high electrical resistance value.

The particle size of the filler is preferably from 0.1 μm to 100 μm, more preferably from 0.3 μm to 30 μm. The term particle size herein refers to volume-average particle size.

The filler content in the elastic layer is preferably from 30 vol % to less than 50 vol %, and more preferably from 35 vol % to 40 vol %, relative to the silicone rubber, from the viewpoint of lowering hardness.

(3-2) Orientation Arrangement State of the Thermally-Conductive Filler in the Elastic Layer The thermally-conductive filler can be oriented/arranged in the below-described electric field application step.

Preferably, arrangement of a large particle filler having a circle-equivalent diameter of 5 μm or larger (for instance, 5 to 30 μm) is to be avoided as much as possible. With binarized images having a size of 150 μm×100 μm as obtained at 5 arbitrary sites in a first cross section of the elastic layer in the thickness direction and the circumferential direction (thickness-circumferential directions), and with binarized images having a size of 150 μm×100 μm as obtained at 5 arbitrary sites in a second cross section of the elastic layer in the thickness direction and the axial direction (thickness-axial directions), then an average value of respective area ratios (%) by the large particle filler in the total 10 binarized images (hereafter also referred to as "average area ratio by the large particle filler") is preferably from 20% to 40%. The area ratio by the large particle filler denotes herein [(sum total of surface areas of large particle filler in binarized image×100)/(surface area of binarized image)]. When the average area ratio by the large particle filler is 20% or higher, the distance between large particle filler particles becomes shorter, such that upon application of a sufficiently intense local electric field, a sufficiently large local electric field can be generated, and small particle filler particles that are present between large particle filler particles can be readily arranged in a sufficient manner. When the average area ratio of the large particle filler is 40% or lower, the hardness of the elastic layer can be readily reduced in a sufficient manner.

Preferably, there is arranged a small particle filler having a circle-equivalent diameter smaller than 5 μm. An average value of the area ratio of the small particle filler in the binarized images (hereafter also referred to as "average area ratio by the small particle filler") lies preferably in the range from 10% to 20%. The area ratio of the small particle filler denotes herein [(sum total of surface areas of small particle filler particles in binarized image×100)/(surface area of binarized image)]. It is difficult to arrange the small particle filler and sufficiently increase the thermal conductivity in a case where the average area ratio by the small particle filler is lower than 10%. The viscosity of the material may rise, and problems may arise in terms of processability and smoothness of the elastic layer, in a case where the average area ratio by the small particle filler is higher than 20%.

The sum of the average area ratio by the large particle filler and the average area ratio by the small particle filler is preferably from 30% to 60%, and particularly preferably from 30% to 50%. The sum of the average area ratio by the large particle filler and the average area ratio by the small particle filler is a value closely related to a volume ratio by the totality of filler in the elastic layer. By prescribing the sum of the average area ratio by the large particle filler and the average area ratio by the small particle filler to lie within the above range it becomes possible to better combine higher thermal conductivity with suppression of increases in hardness, in the elastic layer.

(3-3) Ascertainment of the Arrangement State of the Thermally-Conductive Filler in the Elastic Layer The arrangement state of the thermally-conductive filler can be ascertained by deriving a two-dimensional Fourier transform using a binarized image obtained from a cross-sectional image of the elastic layer. The specific procedure involves the following.

Figure 4A:
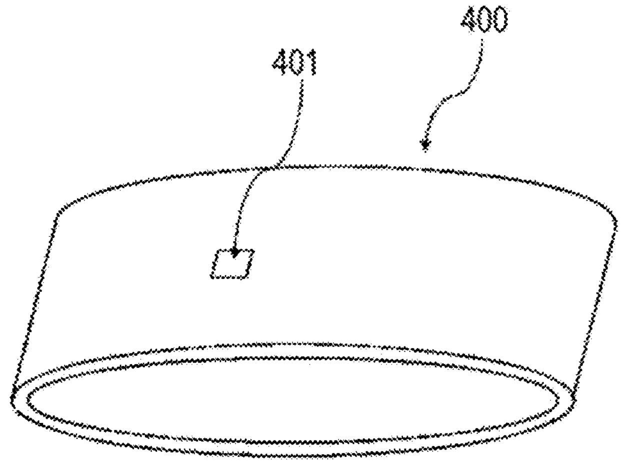
FIG. 4A and FIG. 4B are diagrams illustrating a first cross section and a second cross section of an elastic layer of a fixing member of belt form.
Figure 4B:
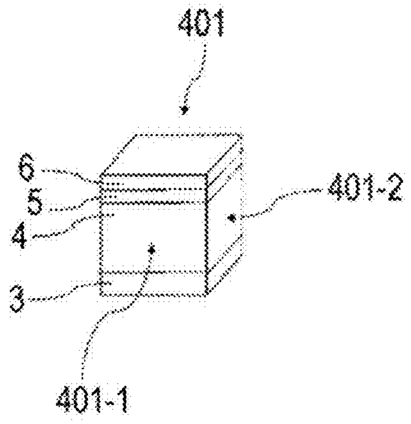

Measurement samples are prepared first. In a case for instance where the fixing member is a fixing belt 400 such as that illustrated in FIG. 4A there are taken for instance 10 samples 401 having a length of 5 mm, a width of 5 mm and a thickness equal to the total thickness of the fixing belt, as illustrated in FIG. 4B, at 10 arbitrary sites of the fixing belt. Cross sections in the circumferential direction of the fixing belt, i.e. cross sections including a first cross section 401-1 of the elastic layer in the in the thickness-circumferential directions, are then polished by ion beam, for 5 samples out of the obtained 10 samples above. Cross sections in a direction perpendicular to the circumferential direction of the fixing belt, i.e. cross sections including a second cross section 401-2 of the elastic layer in the thickness-axial directions, are polished by ion beam, for the remaining 5 samples. A cross-section polisher is used to polish the cross sections by ion beam. Cross section polishing by ion beam allows preventing the filler from sloughing off the sample, while preventing abrasive from being getting mixed into the sample, and allows forming a cross section exhibiting few polishing marks.

Figure 5A:
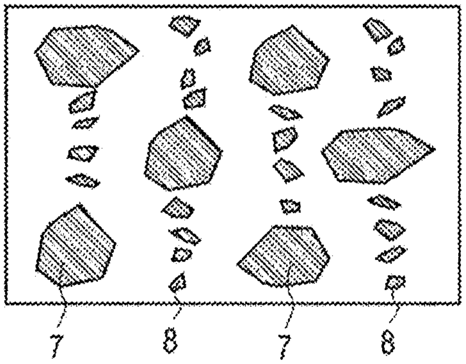
FIG. 5A to FIG. 5F are schematic diagrams illustrating a method for ascertaining a filler arrangement degree and arrangement angle in an elastic layer.

The first cross section of the elastic layer and the second cross section of the elastic layer are observed under a laser microscope or scanning electron microscope (SEM), to acquire respective cross-sectional images in a 150 μm×100 μm region (FIG. 5A), for the 5 samples with polishing of the first cross section of the elastic layer and the 5 samples with polishing of the second cross section of the elastic layer.

Figure 5B:
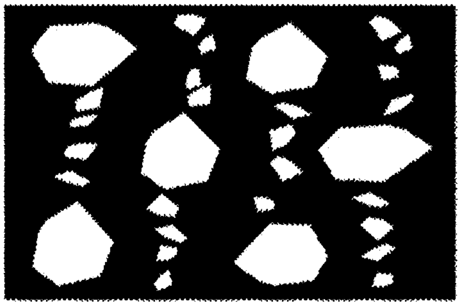

Each obtained image is subjected to black-and-white binarization using commercially available image software, so that filler portions appear white and silicone rubber portions appear black (FIG. 5B). The Otsu method is resorted to as the binarization method.

Figure 5C:
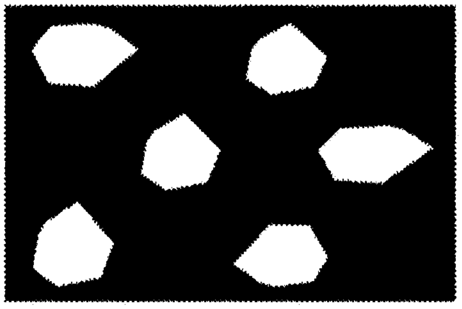
Figure 5D:
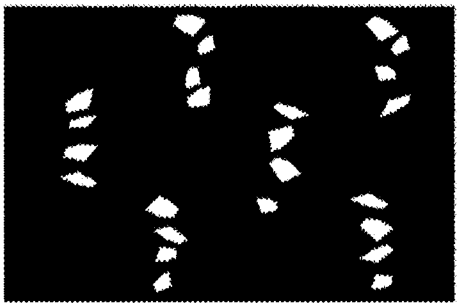

The circle-equivalent diameter of filler particles 7 and 8 in the obtained binarized image are calculated, and the image is divided into an image (FIG. 5C) in which there is left only a large particle filler 7 having an circle-equivalent diameter of 5 μm or larger, and into an image (FIG. 5D) in which there is left only a small particle filler 8 having a circle-equivalent diameter smaller than 5 μm. The area ratios of the large particle filler 7 and the small particle filler 8 (ratio of the total area by the respective filler 7 or 8 relative to the total area of the image) are calculated from the respective images. The circle-equivalent diameter of each filler denotes the diameter of a circle having the same surface area as that of the filler.

Figure 5E:
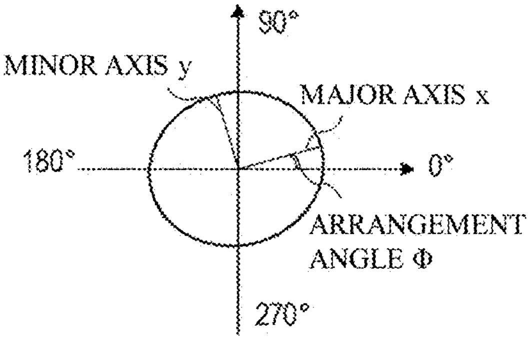
Figure 5F:
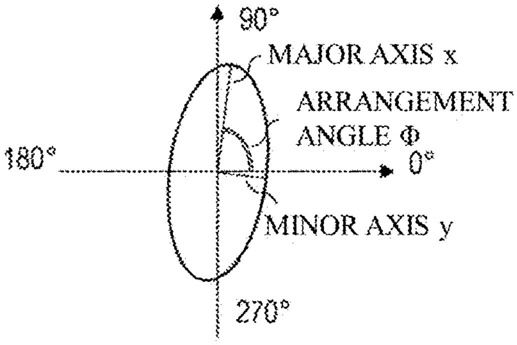

By performing a two-dimensional Fourier transform analysis on the large particle filler image and on the small particle filler image there are obtained respective ellipse plots that depict the direction and degree of filler arrangement (FIG. 5E and FIG. 5F). The two-dimensional Fourier transform itself has a peak in a direction orthogonal to the periodicity of the binarized image, and accordingly the ellipse plots arise from a 900 phase shift of the result of the two-dimensional Fourier transform. From the angle formed by the major axis of the ellipse in each ellipse plot there are worked out an arrangement angle Φ and a filler arrangement degree f defined as $f=1-(y/x)$, with x as the major axis and y as the minor axis of the ellipse.

The arrangement angle Φ represents the array direction of the filler; in FIG. 5E and FIG. 5F the 90°-270° direction denotes the thickness direction of the elastic layer, while the 0°-180° direction denotes the circumferential direction or axial direction of the elastic layer. Accordingly, the closer the arrangement angle Φ is to 90°, the greater is the degree to which the filler is arranged in the thickness direction.

The arrangement degree f denotes the flatness of the ellipse, and takes on a value from 0 to less than 1. When f is 0, the ellipse is a circle, which denotes a completely random state with no arrangement; as f approaches 1, the flatness of the ellipse becomes larger and the arrangement degree of the filler becomes larger.

The arrangement angle Φ and the arrangement degree f of the filler are calculated in the form of the average of numerical values for a total of 10 sites, namely 5 sites of the first cross section of the elastic layer in the thickness-circumferential directions, and 5 sites of the elastic layer in the thickness-axial directions.

In the present embodiment the average area ratio of the large particle filler having a filler particle size (circle-equivalent diameter) of 5 μm or larger is preferably from 20% to 40%, and more preferably from 30% to 35%. In a case where the average area ratio of the large particle filler is 20% or higher, the interparticle distance between the large particle filler particles becomes short, and a local electric field can be readily generated in a simple manner. Therefore, the small particle filler particles present between the large particle filler particles can be sufficiently arranged, such that higher thermal conductivity can be achieved more readily. The hardness of the elastic layer can be readily reduced, in a sufficient manner, in a case where the average area ratio of the large particle filler is 40% or lower.

Herein fL as an average arrangement degree of the large particle filler, ranges preferably from 0.00 to 0.15, and preferably from 0.10 to 0.15. Low hardness of the elastic layer can be achieved when fL is 0.15 or less.

Further, ΦL as an average arrangement angle of the large particle filler may take on any value from 0° to 180°.

The average area ratio of the small particle filler having a particle size of less than 5 μm is preferably from 10% to 20%, more preferably from 10% to 15%. Sufficient high thermal conductivity can be achieved in a case where the average area ratio of the small particle filler is 10% or higher. Problems in processability and smoothness derived from a higher material viscosity can be prevented in a case where the average area ratio of the small particle filler is 20% or lower.

The value of ΦS, as an average arrangement angle of the small particle filler, is preferably from 600 to 120°, more preferably from 80° to 100°. Given that the direction in which ΦS is 90° is the thickness direction of the elastic layer, the closer ΦS is to 90°, the greater is accordingly the degree of arrangement in the thickness direction. Therefore, the thermal conductivity in the thickness direction can be improved when (S lies within the above range. Herein ΦS of 30° and 150° are synonymous with a heat transfer function in the thickness direction, since 300 and 150° exhibit a mirror image relationship with respect to each other, with 90° as the boundary.

(3-4) Step of Applying an Electric Field to the Elastic Layer

An explanation follows next of an embodiment of a corona charging device 2 and a step of applying an electric field to an elastic layer using the corona charging device 2. Corona charging schemes include scorotron schemes relying on a grid electrode between a corona wire and an object to be charged, and corotron schemes without a grid electrode; preferred herein is a scorotron scheme from the viewpoint of controllability of the surface potential of the object to be charged.

Figure 3A:
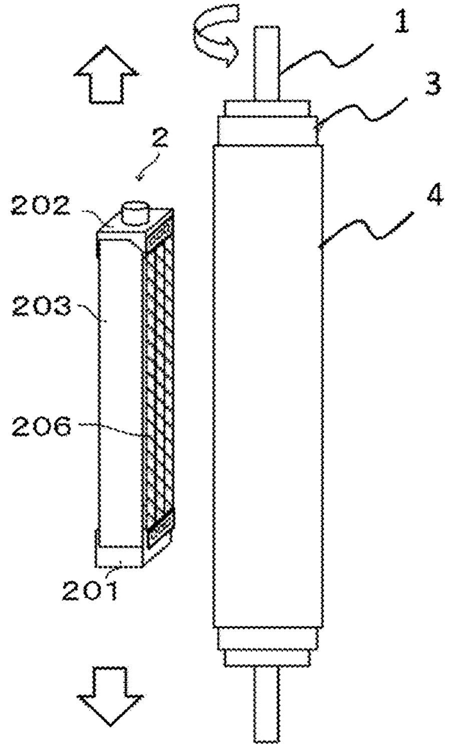
FIG. 3A is an overhead-view diagram of a corona charging device.
Figure 3B:
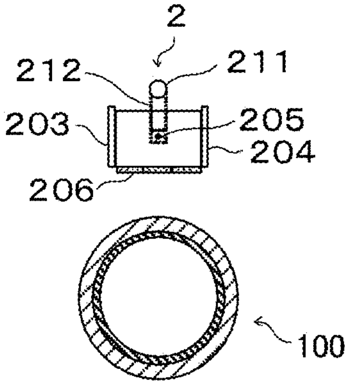
FIG. 3B is a cross-sectional diagram of a corona charging device.

As illustrated in FIG. 3A and FIG. 3B the corona charging device 2 includes a front block 201, a rear block 202, and shields 203, 204. In addition, a discharge wire 205 is spanned between the front block 201 and the rear block 202, such that when a charging bias is applied thereto by a high voltage power supply, the discharge wire 205 undergoes discharge, to thereby charge the surface of the pre-curing elastic layer 4, on the substrate, which is the object to be charged.

High voltage is applied to the discharge wire 205 as a discharge member, in the same manner as that in the structure of a general corona charging device. The ion flow obtained through the discharge to the shields 203, 204 is controlled through application of high voltage to the grid 206, to thereby control the surface of the elastic layer 4 to a desired charging potential. At this time, the substrate 3, or core 1 holding the substrate 3, is grounded (not shown), and accordingly a desired electric field can be generated in the elastic layer 4 by controlling the surface potential of the surface of the elastic layer 4.

In a detailed explanation of the method for producing the fixing member of the above embodiment, firstly an elastic layer having silicone rubber that contains a thermally-conductive filler is formed on a substrate. Next, as illustrated in FIG. 3A, the corona charging device 2 is disposed along the width direction of the pre-curing elastic layer 4, of the fixing member 100, close to and opposing the elastic layer 4. Voltage is applied to the grid 206 of the corona charging device 2 and, in that state, discharge is elicited while causing the fixing member 100 to rotate at for instance 141 rpm for 160 seconds, to thereby charge the surface of the elastic layer. The distance between the surface of the elastic layer and the grid 206 can be set to be 1 mm and 10 mm. By charging the surface of the elastic layer 4 thus, an electric field is generated as a result within the elastic layer, such that the thermally-conductive filler becomes oriented thereby. Thereafter, the elastic layer is cured for instance by heating, to fix the orientation of the filler.

Preferably, the voltage that is applied to the grid 206 lies in the range of 0.1 kV to 3 kV as an absolute value (0.2 to 6 kV at Vp-p in the case of AC being applied), from the viewpoint of eliciting effective electrostatic interactions with the filler. In a case where the orientation of the filler in the thickness direction of the elastic layer is brought about relying on an electric field it is important that the electric field be generated in the thickness direction of the elastic layer 4. If the sign of the applied voltage is set to be equal to the sign of the voltage that is applied to the wire, the direction of the electric field flips, whether the sign is negative or positive; however, the effect that is elicited is the same. In a case where AC charging is performed for the purpose of suppressing below-described liquid surface flow, the phases of the waveforms of the wire and of the grid are preferably match each other. Depending on the type of thermally-conductive filler it may be difficult to impart orientation to an amorphous filler; in such a case it is preferable to increase the voltage that is applied to the grid 206. This ostensibly suggests a relationship between the dielectric constants of the silicone rubber component and of the thermally-conductive filler. In a case where the difference in dielectric constant between the silicone rubber and the filler is large, it is possible to impart orientation to the amorphous filler, with a comparatively small applied voltage. In a case by contrast where the voltage applied to the grid 206 is excessive, electrostatic repulsion forces derived from the surface charge of the elastic layer become larger, giving rise to liquid surface flow and impairment of the surface properties of the elastic layer 4. Therefore, more preferably the voltage that is applied to the grid 206 lies in the range of 0.1 kV to 1.5 kV as an absolute value (1.2 to 3 kV at Vp-p in the case of AC being applied). Such liquid surface flow can be mitigated by AC charging.

As a configuration for potential control of the elastic layer surface in the longitudinal direction, for instance the configuration illustrated in FIG. 3A can be resorted to in which the entirety of the of the elastic layer 4 is charged by causing the fixing belt 11 to rotate about the central axis thereof while voltage is applied to the grid 206. The rotational speed of the fixing belt is preferably 10 rpm to 500 rpm, and the processing time is preferably 20 seconds or longer, from the viewpoint of stably imparting orientation to the filler. Orienting of the amorphous filler can be controlled by controlling the surface potential and the time of application of the electric field.

In the corona charging device a reciprocating vibration of about ±1 to 10 mm in the longitudinal direction of the fixing member, at a frequency of about 1 to 10 Hz, is elicited by a reciprocating mechanism, as a result of which it becomes possible to curtail sharp changes in thermal conductivity, surface properties and hardness at a boundary portion between a region to which the electric field is applied and a region to which no electric field is applied.

Stainless steel, nickel, molybdenum, tungsten or the like may be used as the discharge wire 205 but herein there is preferably used tungsten, which boasts very high stability among metals. The discharge wire spanned inward of the shields may exhibit a circular cross-sectional shape, or a sawtooth-like shape.

The diameter of the discharge wire 205 is preferably 40 μm to 100 μm. The underlying reason for this is that, by prescribing the diameter of the discharge wire to lie within such a range, the discharge wire can be prevented from being cut off by ions during discharge, while doing away with the need for excessively high voltage as required in order to trigger corona discharge. Either DC voltage or AC voltage can be used as the voltage that is applied to the discharge wire 205. In the case of AC voltage, the latter is applied preferably at a frequency of about 0.01 Hz to 1000 Hz. Voltage application can be accomplished by outputting for instance a rectangular wave or a sine wave using an arbitrary waveform generator.

(3-5) Adjustment of the Elastic Modulus of Silicone Rubber

In order to bring out high thermal conductivity in the elastic layer of the present disclosure, the filler is preferably caused to be oriented/arranged in the thickness direction, in the above-described process. In a case where the filler is caused to be oriented/arranged anisotropy with respect to the tensile modulus in a direction perpendicular to the thickness direction arises in proportion to the increase in compressive modulus (hardness) in the thickness direction, as compared with an instance where the filler is not subjected to a filler orientation treatment.

By arranging the thermally-conductive filler in the thickness direction of the elastic layer in order to increase the thermal conductivity of the elastic layer in the thickness direction, the value of a ratio (tensile modulus/compressive modulus) of the tensile modulus of the elastic layer in a direction perpendicular to the thickness direction, relative to the compressive modulus of the elastic layer in the thickness direction can be 0.80 or lower. The lower limit of the above ratio is not particularly restricted, but is for instance 0.10 or higher. The value of the above ratio is preferably 0.10 to 0.55, more preferably 0.10 to 0.40.

The fact that the "tensile modulus/compressive modulus" of the elastic layer takes on the above value signifies that anisotropy arises between the compressive modulus in the thickness direction and tensile modulus in a direction perpendicular to the thickness direction. This can be indicative of the fact that the compressive modulus is relatively hard, on account of the arrangement of the filler, with respect to flexibility of the silicone rubber in the elastic layer, and is indicative also of the degree of arrangement of the filler in the elastic layer as a whole.

The value of the above ratio can be adjusted for instance by adjusting the degree of crosslinking of the silicone rubber and/or by controlling the degree of arrangement of the filler in the above electric field application step at the time of formation of the elastic layer.

On the other hand, the ability to conform to unevenness of paper fibers decreases when the elastic modulus in the compression direction increases, and hence the elastic modulus (degree of crosslinking) of the silicone rubber (polymer) excluding the filler is lowered, compressive modulus of the elastic layer as a whole being set to lie in the range of 0.19 to 0.57 MPa, for the purpose of offsetting increases in elastic modulus.

Figure 6A:
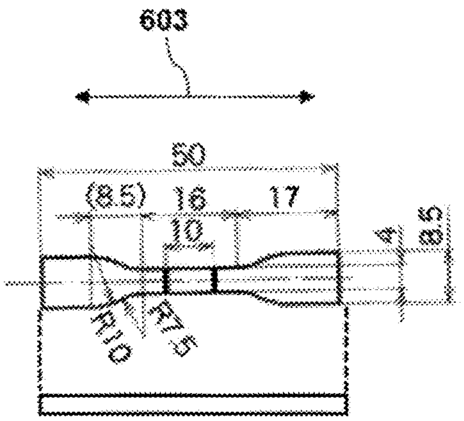
FIG. 6A and FIG. 6B are an explanatory diagrams of a method for measuring the tensile modulus of an elastic layer according to the present disclosure.

Herein, the tensile modulus in a direction perpendicular to the thickness direction of the elastic layer is an index of the degree of crosslinking of the silicone rubber in the elastic layer, i.e. of the elastic modulus of the silicone rubber. Specifically, the compressive modulus of the elastic layer is influenced not only by the elastic modulus of the silicone rubber in the elastic layer but also by the arrangement state of the thermally-conductive filler. On the other hand the tensile modulus of the elastic layer in a direction perpendicular to the thickness direction is determined by the silicone rubber in the elastic layer. In the elastic layer according to the present disclosure, the tensile modulus in a direction perpendicular to the thickness direction is 0.20 MPa or less, preferably 0.19 MPa or less, and more preferably 0.18 MPa or less. The lower limit is not particularly restricted, but is preferably 0.01 MPa or more, particularly preferably 0.10 MPa or more, from the viewpoint of preserving the strength of the elastic layer. A preferred range of the tensile modulus is 0.01 to 0.20 MPa, in particular 0.10 to 0.20 MPa, and further 0.10 to 0.19 MPa. By virtue of the fact that the tensile modulus of the elastic layer in a direction perpendicular to the thickness direction is 0.20 MPa or less, the compressive modulus of the entire elastic layer can be set to lie in the above range from 0.19 to 0.57 MPa even when the thermally-conductive filler in the elastic layer is arranged in the thickness direction. In a case for instance where the electrophotographic member according to the present disclosure is an electrophotographic belt having an endless shape or an electrophotographic roller having a roller shape, the direction perpendicular to the thickness direction of the elastic layer (arrow 603 in FIG. 6A) may denote the circumferential direction of the electrophotographic belt or the electrophotographic roller, or a direction perpendicular to the circumferential direction, i.e. the direction along the rotation axis, of the foregoing.

In order to bring the tensile modulus in the direction perpendicular to the thickness direction of the elastic layer to lie within the above range it is effective to increase the molecular weight of component (a) to thereby increase the distance between crosslinking points, and/or to adjust the addition amount of component (b), so that crosslinking density is not excessively high.

Specifically, the molar ratio (H/Vi) of Si—H in component (b) and of unsaturated aliphatic groups in component (a) is preferably 0.5 or lower, and a toluene extraction rate is about 30 to 45%.

A cuboid sample having a length of 50 mm, a width of 50 mm and a thickness of 150 μm, sampled from the elastic layer according to the present embodiment, is placed in an atmosphere at an oxygen concentration of 1 vol % or lower and at a temperature of 240° C., for 100 hours. Taking H10 to H100 as average values of three measurements of the compressive modulus of the sample in the thickness direction, every 10 hours, then the rate of decrease at each of the compressive moduli H10 to H100, relative to a compressive modulus H0 at 0 hours as a reference, is 5% or lower. The fact that the rate of decrease of each of H10 to H100 is 5% or lower signifies that the elastic layer is not prone to undergoing softening deterioration over a long period of time throughout durability.

The molecular weight Mw of the silicone rubber is preferably 60,000 to 100,000. When Mw is 60,000 or higher, elastic modulus is low, whereas when Mw is 100,000 or lower, polymer viscosity does not rise excessively during electric field orientation, such that the filler can be oriented more readily.

A swelling rate in a toluene extraction test is a known method for indirectly measuring the crosslinking density of silicone rubber; herein, a swelling rate calculated in accordance with the expression below is preferably from 900% to 1200%.

$$\text{Swelling rate }(\%)=(W\text{tol}-Wf)/(W\text{dry}-Wf)$$

Wtol: weight of sample containing toluene after immersion in toluene

Wf: filler weight in sample

Wdry: sample weight after toluene dry-off following immersion in toluene

When the swelling rate is 900% or lower it is difficult to bring about an elastic modulus of 0.20 MPa or less, whereas a swelling rate of 1200% or higher entails excessive flexibility, which translates into impaired moldability.

By adjusting the swelling rate so as to lie in the above ranges, the elastic layer can exhibit low flexibility, i.e. a tensile modulus of 0.20 MPa or less.

(3-6) Measures Against Softening Deterioration of the Elastic Layer

Methods for slowing down the progress of softening deterioration in the elastic layer over long periods of time, throughout durability, include a method that involves further subjecting the cured elastic layer to high-temperature baking, to promote beforehand oxidation/condensation reactions of methyl groups, and form a branched organopolysiloxane structure. A detailed explanation follows next.

Method for further subjecting a cured elastic layer to high-temperature baking, and promote beforehand oxidation/condensation reactions of methyl groups, to form a branched organopolysiloxane structure The elastic layer after curing is heated in in an oxygen-free state at a high temperature ranging from 280° C. to 350° C., more preferably from 300° C. to 350° C., to elicit, as a result, methyl group oxidation/condensation as per Reaction formula (5) below, and methyl group oxidization/cracking reaction as per Reaction formula (6). The heating time is, for instance, 1 minute to 10 minutes.

(5)

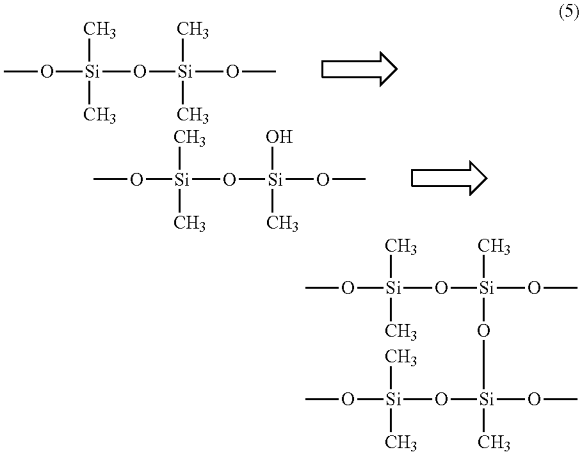

(6)

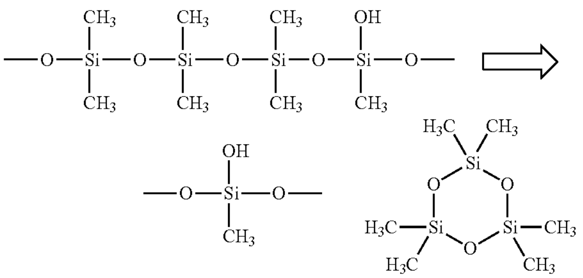

Through heating of the elastic layer at a high temperature in a low oxygen concentration state, a softening reaction derived from oxidation/cracking of methyl groups, and a curing reaction derived from oxidation/condensation, proceed simultaneously in the elastic layer. It is deemed that, once the softening reaction and the curing reaction have proceeded to a given extent, the changing hardness stabilizes at the same hardness as that prior to high-temperature heating, and the elastic layer does not readily undergo softening deterioration.

Once the above change has progressed, a branched organosiloxane structure becomes thereupon formed such as that given by Reaction formula (5). The branched organosiloxane structure contains, per Si atom, three Si—O bonds exhibiting a larger bond energy than that of Si—C bonds with side chain methyl groups or Si—C—C and Si bonds of crosslink points; the branched organosiloxane structure is thus stable towards thermal loads and mechanical loads.

Guidelines for such a state include: a value (T unit/D unit) of 0.030 or higher for a ratio of T units (three O atoms bonded to one Si atom) relative to D units (two O atoms bonded to one Si atom) of the siloxane bonds in the silicone rubber; and a total generation amount of 1.5 ppm or larger of hexamethylcyclotrisiloxane (D3), octamethylcyclotetrasiloxane (D4) and decamethylcyclopentasiloxane (D5) upon heating of the silicone rubber at 150° C. for 1 hour. More preferably, either of the foregoing is satisfied, since that way the change in hardness is small in subsequent use. The former guideline denotes that the curing reaction of the silicone rubber has proceeded completely to stability, whereas the latter guideline denotes that the softening reaction of the silicone rubber has proceeded completely to stability.

The value of the ratio of T units relative to D units is preferably 0.030 to 0.100, more preferably 0.030 to 0.060.

The total generation amount of cyclic siloxanes D3 to D5 is preferably 1.5 to 10 ppm, more preferably 2.0 to 5.0 ppm.

The value of the ratio of T units (three O atoms bonded to one Si atom) relative to the D units (two O atoms bonded to one Si atom) of the siloxane bonds of the silicone rubber in the elastic layer is calculated as a result of a measurement relying on nuclear magnetic resonance analysis ($^{29}$Si-NMR (product name: JEOL JNM-ECA400; by JEOL Resonance Co., Ltd.)). The sample was isolated from the elastic layer by inserting a blade in the vicinity of the interface between a base layer and the elastic layer of the fixing member, and in the vicinity of the interface between the elastic layer and the surface layer.

The ratio of the integration value of peaks (55-60 ppm) corresponding to the T units and the integration value of peaks (up to 25 ppm) corresponding to the D units is quantified and calculated. The measurement is carried out in accordance with the DDMAS method, with 1000 as the number of scans.

The generation amount of cyclic siloxane upon heating of the silicone rubber at 150° C. for 1 hour is worked out by headspace gas chromatography mass spectrometry (HS-GC/MS), on the basis of a summation of integration values of retention times (RT) for cyclic siloxanes D3, D4 and D5 relative to the integration value for a measurement of toluene, as a reference substance, at a predetermined concentration. The measuring device that is used is HS-GC/MS (product name: TurboMatrix HS40 Clarus 690 GC; by PerkinElmer Inc.), with measurement conditions that include HS temperature: 150° C. for 1 hour, GC: 40-300° C. (52 minutes), and MS: 35 to 500 Da.

(4) Adhesive Layer of the Fixing Member

As illustrated in FIG. 2A and FIG. 2B, the adhesive layer 5 is a layer formed by bonding the elastic layer 4 and the surface layer (release layer) 6, using for instance an addition-curable silicone rubber adhesive. An addition-curable silicone rubber containing a self-adhesive component is preferably used herein as the adhesive. Specifically, the addition-curable silicone rubber contains an organopolysiloxane that has a plurality of unsaturated aliphatic groups typified by vinyl groups, in the molecular chain, a hydrogen organopolysiloxane, and a platinum compound as a cross-linking catalyst. The addition-curable silicone rubber is cured as a result of an addition reaction. Known adhesives can be used as such adhesives.

Examples of self-adhesive components include the following:

Silanes having at least one, and preferably two or more, functional groups selected from the group consisting of alkenyl groups such as vinyl groups, (meth)acryloxy groups, hydrosilyl groups (SiH groups), epoxy groups, alkoxysilyl groups, carbonyl groups and phenyl groups;

Organosilicon compounds such as cyclic or linear siloxanes having from 2 to 30 silicon atoms, preferably from 4 to 20 silicon atoms;

Non-silicon organic compounds (i.e. compounds containing no silicon atoms in the molecule) optionally containing oxygen atoms in the molecule. However, one molecule of the organic compound contains, per molecule, from 1 to 4 aromatic rings, and preferably from 1 to 2 aromatic rings, for instance phenylene structures, having a valence from 1 to 4, preferably from 2 to 4. Each molecule of the organic compound contains at least one, and preferably from 2 to 4, functional groups (for instance alkenyl groups, (meth)acryloxy groups) that can contribute to a hydrosilylation addition reaction.

The above self-adhesive component can be used singly or in combinations of two or more types.

From the viewpoint of adjusting viscosity and ensuring heat resistance, filler components can be added to the adhesive, within a scope consistent with the purport of the present disclosure. Examples of such filler components include:

Silica, alumina, iron oxide, titanium oxide, cerium oxide, cerium hydroxide and carbon black.

Such addition-curable silicone rubber adhesives are commercially available and can be easily procured.

The thickness of the adhesive layer is preferably 20 μm or less. By prescribing the thickness of the adhesive layer to 20 μm or less, the thermal resistance of the fixing member can be set to be small, and heat from the inner surface side (substrate side) can be efficiently transmitted to a recording material (recording medium).

(5) Surface Layer of the Fixing Member

The surface layer 6 is made up of a fluororesin, with a tube method or a coating method being resorted to as a molding method. A tube method that involves coating a tubular molded product of the resins exemplified below.

A tetrafluoroethylene-perfluoro(alkyl vinyl ether) copolymer (PFA), polytetrafluoroethylene (PTFE), a tetrafluoroethylene-hexafluoropropylene copolymer (FEP) and the like. Preferred among the resin materials exemplified above is PFA, from the viewpoint of moldability and toner releasability.

The thickness of the fluororesin layer (surface layer) is preferably from 10 μm to 50 μm. That is because upon laying of the fluororesin layer, the elasticity of the underlying elastic layer can be maintained, and the surface hardness of the fixing member can be prevented from becoming excessively high, while ensuring wear resistance.

Adhesiveness can be improved by subjecting beforehand the inner surface of the fluororesin tube to a sodium treatment, an excimer laser treatment, an ammonia treatment or the like.

Figure 9:
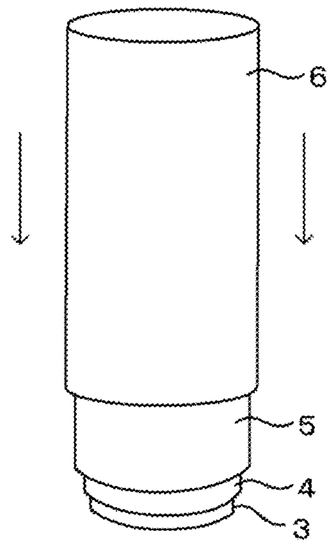
FIG. 9 is a schematic diagram of an example of a step of overlaying a surface layer.

FIG. 9 is a schematic diagram of an example of a step of laying up the surface layer 6 on the elastic layer 4 containing silicone rubber, across an addition-curable silicone rubber adhesive. An addition-curable silicone rubber adhesive 5 is applied to the surface of the elastic layer 4 formed on the outer peripheral surface of the substrate 3. The outer surface is then further coated with (overlaid with) a fluororesin tube 6, as the surface layer 6.

The method for coating the fluororesin tube is not particularly limited, and there may be used a method that involves applying an addition-curable silicone rubber adhesive as a lubricant, or a method that involves expanding the fluororesin tube from the outside, followed by coating of the fluororesin tube.

Surplus addition-curable silicone rubber adhesive 5 remaining between the elastic layer 4 and the surface layer 6 made up of a fluororesin is removed through handling using some means, not shown. The thickness of the adhesive layer 5 after handling is preferably 20 μm or less, from the viewpoint of heat conductivity.

The addition-curable silicone rubber adhesive 5 is then heated for a predetermined time by a heating means, such as an electrical oven, so that the addition-curable silicone rubber adhesive 5 becomes cured and bonded as a result; a fixing member can then be obtained through cutting of both width-direction ends of the resulting product to a desired length.

(6) Thermal Fixing Apparatus

The heat fixing apparatus according to the present embodiment is configured in such a manner that rotating members such as a pair of heated rollers, a belt and a roller, or a belt and a belt, are pressed against each other. The type of heat fixing apparatus is selected as appropriate taking into consideration conditions such as the process speed and size of the entire image forming apparatus having the heat fixing apparatus mounted thereon.

In the heat fixing apparatus a heated fixing member and a pressing member are brought into pressure contact with each other to thereby form a fixing nip N; thereupon, a recording medium S as a heated body, having an image formed thereon by unfixed toner, is transported to and nipped at the fixing nip N. An image formed with unfixed toner will be referred to as a toner image t. The toner image t is heated and pressed thereby. In consequence the toner image t melts, with color mixing, and is thereafter cooled, to thereby fix the image on the recording medium.

The structure of the heat fixing apparatus will be explained below on the basis of concrete examples, but the scope and uses of the present invention are not meant to be limited to the examples below.

(6-1) Thermal Fixing Apparatus of Fixing Belt-Pressing Belt Type

Figure 7:
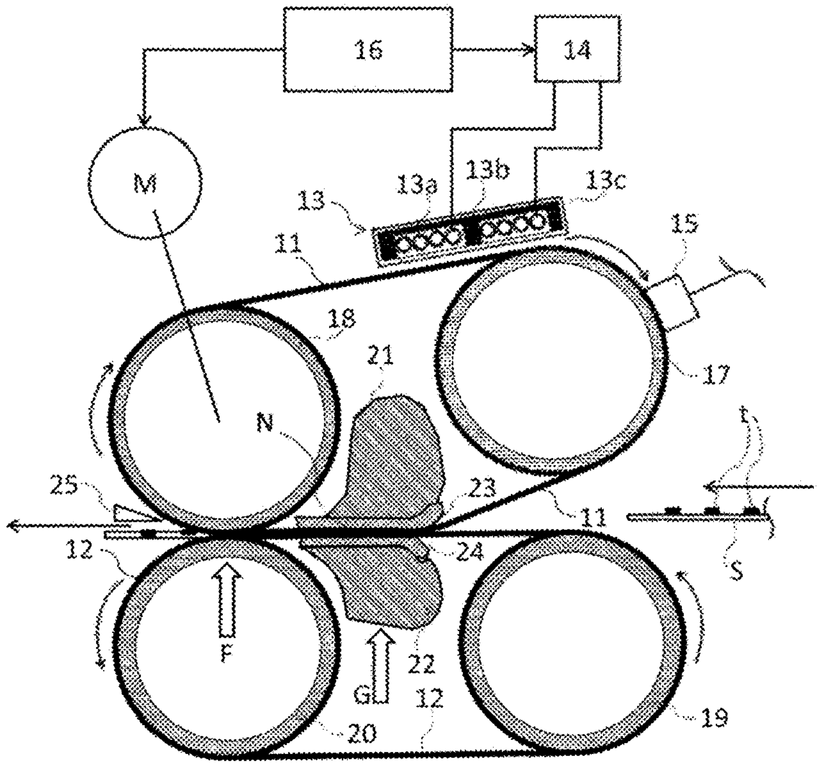
FIG. 7 is a cross-sectional schematic diagram of an example of a heat fixing apparatus of heating belt-pressing belt type.

FIG. 7 is a cross-sectional schematic diagram of an example of a so-called twin belt type heat fixing apparatus in which a pair of rotating members in the form of a fixing belt 11 and a pressing belt 12 are pressed against each other, the heat fixing apparatus being provided with a fixing belt as a fixing member and a pressing belt as a pressing member.

The width direction of the heat fixing apparatus, or of members that make up the heat fixing apparatus, is a direction perpendicular to the paper surface of FIG. 7. The front face of the heat fixing apparatus is a face on the introduction side of the recording medium S. The terms left and right denote left and right when viewing the heat fixing apparatus from the front face. The width of the belt is the dimension thereof in the left-right direction, when viewing the apparatus from the front face. The width of the recording medium S is the dimension thereof in a direction perpendicular to the transport direction. The terms upstream or downstream denote upstream and downstream with respect to the transport direction of the recording medium.

This heat fixing apparatus includes the fixing belt 11 as a fixing member and the pressing belt 12 as a pressing member. The fixing belt 11 and the pressing belt 12 are configured through spanning, between two rollers, of a fixing belt such as that illustrated in FIG. 2A having a flexible substrate made of a metal the main component whereof is nickel.

A heating source (induction heating member or excitation coil) capable of eliciting electromagnetic induction heating with high energy efficiency is used herein as the heating means of the fixing belt 11. An induction heating member 13 includes an induction coil 13*a*, an excitation core 13*b*, and a coil holder 13*c* that holds the foregoing. An elliptically and flatly wound litz wire is used as the induction coil 13*a*, the induction coil 13*a* being disposed in a horizontal E-shaped excitation core 13*b* having protrusions in the center and both sides of the induction coil. The excitation core 13*b* is made up of a material such as ferrite or a permalloy exhibiting high magnetic permeability and low residual magnetic flux density, thanks to which losses in the induction coil 13*a* and the excitation core 13*b* can be suppressed, and the fixing belt 11 can be heated up efficiently.

When a high-frequency current flows from the excitation circuit 14 to the induction coil 13*a* of the induction heating member 13, the substrate of the fixing belt 11 generates induction heat, and the fixing belt 11 becomes heated from the side of the substrate. The surface temperature of the fixing belt 11 is detected by a temperature detection element 15 such as a thermistor. A signal pertaining to the temperature of the fixing belt 11 having been detected by the temperature detection element 15 is transmitted to a control circuit section 16. The control circuit section 16 controls the power supplied from the excitation circuit 14 to the induction coil 13*a* in such a manner that temperature information received from the temperature detection element 15 is maintained at a predetermined fixation temperature, to thereby adjust the temperature of the fixing belt 11 to a predetermined fixation temperature.

The fixing belt 11 is spanned by a roller 17 as a belt rotating member, and by a heating-side roller 18. The roller 17 and the heating-side roller 18 are rotatably supported by bearings between left and right side plates, not shown, of the apparatus.

The roller 17 is for instance a hollow roller made of iron and having an outer diameter of 20 mm, an inner diameter of 18 mm and a thickness of 1 mm, and which functions as a tension roller which applies tension to the fixing belt 11. The heating-side roller 18 is for instance a highly slidable elastic roller having a silicone rubber layer, as an elastic layer, provided on an iron-alloy metal core that has an outer diameter of 20 mm and a diameter of 18 mm.

The heating-side roller 18 as a driver roller is rotationally driven, at a predetermined speed in the clockwise direction of the arrow, by having a drive force inputted thereto from a drive source (motor) M. By providing the elastic layer on the heating-side roller 18 as described above, the driving force inputted to the heating-side roller 18 can be satisfactorily transmitted to the fixing belt 11, and there can be formed the fixing nip for ensuring separability of the recording medium from the fixing belt 11. Little heat is transmitted to the heating-side roller by virtue of the fact that the heating-side roller 18 has thus the elastic layer; this is accordingly effective in terms of shortening warm-up times.

Upon rotational driving of the heating-side roller 18, the fixing belt 11 rotates together with the roller 17 on account of the friction between the silicone rubber surface of the heating-side roller 18 and the inner surface of the fixing belt 11. The arrangement and size of the roller 17 and the heating-side roller 18 are selected depending on the size of the fixing belt 11. For instance the dimensions of the roller 17 and the heating-side roller 18 are selected so that the fixing belt 11, which has an inner diameter of 55 mm when unattached, can be spanned around the rollers.

The pressing belt 12 is spanned between a tension roller 19 and a pressure-side roller 20 as belt rotating members. The inner diameter of the pressing belt when unattached is for instance 55 mm. The tension roller 19 and the pressure-side roller 20 are rotationally supported, on bearings, between the left and right side plates, not shown, of the apparatus.

The tension roller 19 has for instance a silicone sponge layer provided, for the purpose of reducing heat conduction from the pressing belt 12, on an iron-alloy metal core having an outer diameter of 20 mm and a diameter of 16 mm.

The pressure-side roller 20 is for instance a rigid roller made up of a 2 mm-thick iron alloy having an outer diameter of 20 mm and an inner diameter of 16 mm, and exhibiting low sliding properties. The dimensions of the tension roller 19 and the pressure-side roller 20 are similarly selected in concert with the dimensions of the pressing belt 12.

In order to form a nip N between the fixing belt 11 and the pressing belt 12, the pressure-side roller 20 is pressed towards the heating-side roller 18 by being acted upon by a predetermined pressure force exerted, in the direction of arrow F, by a pressing mechanism not shown.

Pressing pads are used in order to obtain a wide nip N without increasing the size of the apparatus. Specifically, a fixing pad 21 as a first pressing pad presses the fixing belt 11 towards the pressing belt 12, and a pressing pad 22 as a second pressing pad presses the pressing belt 12 towards the fixing belt 11. The fixing pad 21 and the pressing pad 22 are supported between left and right side plates, not shown, of the apparatus. The pressing pad 22 is pressed towards the fixing pad 21 at a predetermined pressure force, in the direction of arrow G, by a pressing mechanism not shown. The fixing pad 21, which is the first pressing pad, has a pad base and a sliding sheet (low friction sheet) 23 that is in contact with the belt. The pressing pad 22, which is the second pressing pad, also has a sliding sheet 24 that is in contact with the pad base and the belt. That is because a problem arises in that the portion of the pads that rubs against the inner peripheral surface of the belt undergoes significant abrasion. By interposing thus the sliding sheets 23 and 24 between the belt and the pad base it becomes possible to prevent the pads from being abraded, and to reduce sliding resistance, so that good belt running performance and belt durability can be ensured as a result.

The fixing belt is provided with a contactless static elimination brush (not shown), and the pressing belt is provided with a contact static elimination brush (not shown).

The control circuit section 16 drives the motor M at least during execution of image formation. As a result, the heating-side roller 18 is rotationally driven, and likewise the fixing belt 11 is rotationally driven in the same direction. The pressing belt 12 rotates accompanying the fixing belt 11. Belt slipping can be prevented by configuring the farthest downstream portion of the fixing nip in such a manner that the fixing belt 11 and the pressing belt 12 are transported, while nipped, by the roller pair 18, 20. The farthest downstream portion of the fixing nip is a portion where a pressure distribution in the fixing nip (in the transport direction of the recording medium) is maximal.

In a state where the fixing belt 11 has been raised to and maintained at a predetermined fixation temperature (referred to as temperature control), the recording medium S having the unfixed toner image t is transported to the nip N between the fixing belt 11 and the pressing belt 12. The recording medium S is introduced in such a manner that the surface bearing the unfixed toner image t faces the fixing belt 11. As a result of the unfixed toner image t of the recording medium S being conveyed while nipped in close contact with the outer peripheral surface of the fixing belt 11, heat is applied thereto from the fixing belt 11, which combined with the received pressure force, causes the toner image t to be fixed to the surface of the recording medium S. At this time heat from the heated substrate of the fixing belt 11 is efficiently transmitted, towards the recording medium S, through the elastic layer having increased thermal conductivity in the thickness direction. Thereafter, the recording medium S is separated from the fixing belt by a separation member 25, to be further transported.

(6-2) Thermal Fixing Apparatus of Fixing Belt-Pressing Roller Type

Figure 8:
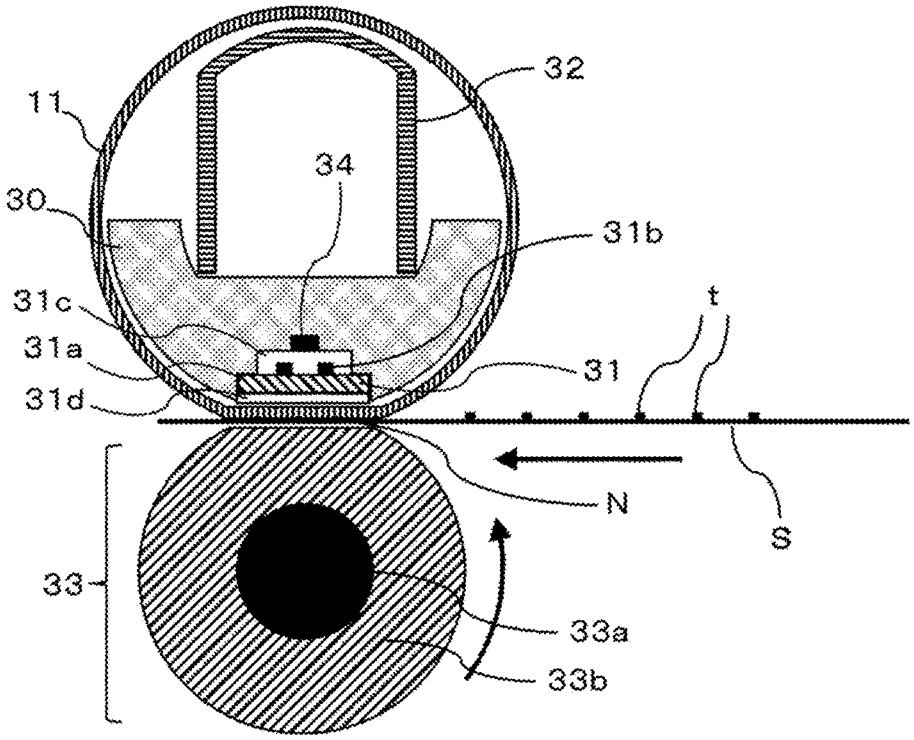
FIG. 8 is a cross-sectional schematic diagram of an example of a heat fixing apparatus of heating belt-pressing roller type.

FIG. 8 is a schematic diagram illustrating an example of a heat fixing apparatus of fixing belt-pressing roller type that utilizes a ceramic heater as a heating element. In FIG. 8 the reference symbol 11 denotes a tubular or endless fixing belt; herein there is used an endless fixing belt such as the one described above. The apparatus has a heat-resistant and heat-insulating belt guide 30 for holding the fixing belt 11, and a ceramic heater 31 for heating the fixing belt 11 and that is fixed and supported, by being fitted into a groove formed along the length of the guide, at a position of contact with the fixing belt 11 (i.e. at substantially the central portion of the lower surface of the belt guide 30). The fixing belt 11 is loosely fitted around the belt guide 30. A pressing rigid stay 32 is inserted inward of the belt guide 30.

A pressing roller 33 is provided that opposes the fixing belt 11. In the present example the pressing roller is an elastic pressing roller, i.e. an elastic layer 33*b* of silicone rubber is provided on a metal core 33*a*, of lowered hardness, by virtue of the fact that both ends of the metal core 33*a* are rotatably held between front and rear chassis-side plates, not shown, of the apparatus. The elastic pressing roller is coated with a PFA (tetrafluoroethylene/perfluoroalkyl ether copolymer) tube, for the purpose of improving surface properties.

A downward pushing action is exerted, on the pressing rigid stay 32, by providing respective pressing springs (not shown) between apparatus chassis-side spring receiving members (not shown) and both ends of the pressing rigid stay 32. As a result, the lower surface of the ceramic heater 31 disposed on the lower surface of the belt guide member 30 made up of heat-resistant resin, and the top surface of the pressing roller 33, press against each other, with the fixing belt 11 sandwiched therebetween, to form thereby the fixing nip N.

The pressing roller 33 is rotationally driven in a counterclockwise direction, as denoted by the arrow, by a driving means not shown. A rotational force acts on the fixing belt 11 on account of a frictional force between the outer surfaces of the fixing belt 11 and the pressing roller 33, as derived from rotational driving of the pressing roller 33; as a result, the inner surface of the fixing belt 11 slides over, in close contact with, the lower surface of the ceramic heater 31, at the fixing nip N, while rotating at the same time around the exterior of the belt guide 30 at a peripheral speed substantially corresponding to the rotational peripheral speed of the pressing roller 33, in a clockwise direction as denoted the arrow (pressing roller driving scheme).

On the basis of a print start signal, the pressing roller 33 begins to rotate and the ceramic heater 31 begins to heat up. The rotation peripheral speed of the fixing belt 11 is made constant as a result of the rotation of pressing roller 33, such that the moment that the temperature of the temperature detection element 34 provided on the top surface of the ceramic heater rises to a predetermined temperature, for instance 180° C., the recording medium S bearing the unfixed toner image t as a material to be heated is introduced between the fixing belt 11 and the pressing roller 33 at the fixing nip N in such a manner that the toner image bearing surface side faces the fixing belt 11. The recording medium S comes into close contact with the lower surface of the ceramic heater 31 across the fixing belt 11, at the fixing nip N, and moves through the fixing nip N together with the fixing belt 11. During this moving process heat from the fixing belt 11 is applied to the recording medium S, and the toner image t becomes thereby heat-fixed on the surface of the recording medium S. The recording medium S having passed through the fixing nip N separates from the outer surface of the fixing belt 11 to be further transported.

The ceramic heater 31 as a heating element is a linear heating element having low heat capacity, and being elongated in a direction perpendicular to a movement direction of the fixing belt 11 and the recording medium S. Preferably, the basic configuration of ceramic heater 31 includes: a heater substrate 31*a* made up of aluminum nitride or the like; a heat generating layer 31*b* provided longitudinally on the surface of the heater substrate 31*a*, the heat generating layer 31*b* resulting from coating, for instance by screen printing, about 10 μm of an electrically resistive material such as Ag/Pd (silver/palladium), over a width of 1 to 5 mm; and a protective layer 31*c* of glass, fluororesin or the like, further provided on the heat generating layer 31*b*. The ceramic heater to be used is not limited to a ceramic heater of the above type.

The heat generating layer 31*b* generates heat, such that the heater 31 becomes rapidly heated up, as a result of energization across both ends of the heat generating layer 31*b* of the ceramic heater 31.

The ceramic heater 31 is fixed and supported by being fitted into a groove formed along the length of the guide, at substantially the central portion of the lower surface of the belt guide 30, in such a manner that the protective layer 31*c* side faces upwards. At the fixing nip N that is in contact with the fixing belt 11 the surface of a sliding member 31*d* of the ceramic heater 31 and the inner surface of the fixing belt 11 slide over each other while in mutual contact.

In the fixing belt 11, as described above, the thermal conductivity in the thickness direction of the elastic layer containing silicone rubber is increased, and also hardness is also kept low. In such a configuration the fixing belt 11 can efficiently heat the unfixed toner image while exhibiting low hardness, and as a result a high-quality image can become fixed on the recording medium S at the time of fixing nipping.

As described above, one aspect of the present disclosure provides a heat fixing apparatus having a fixing member disposed thereon. Therefore, a heat fixing apparatus can be provided in which there is disposed a fixing member boasting excellent fixing performance and excellent image quality.

EXAMPLES

The present invention will be explained in further detail next by way of examples. However, the present disclosure is not limited to these examples. Hereafter, the term "parts" denotes "parts by mass".

Example 1

(1) Preparation of a Liquid Addition-Curable Silicone Rubber Composition

As component (a) there were prepared first 100 parts by mass of a silicone polymer, having vinyl groups as an unsaturated aliphatic group, only at both ends of the molecular chain, and having methyl groups as unsubstituted hydrocarbon groups, while containing no other unsaturated aliphatic groups. This silicone polymer (product name: DMS-V35, by Gelest Inc., viscosity 5000 $mm^2/s$) will be hereafter referred to as "Vi".

To this Vi there were next added as component (d) 124 parts by mass of large-diameter metallic silicon (product name: #350, by Kinsei Matec Co., Ltd.) and 41 parts by mass of small-diameter metallic silicon (product name: FINE, by Kinsei Matec Co., Ltd.), and the whole was set in a rotating/revolving mixer (ARV-310, by Thinky Corporation), with stirring and mixing at 2000 rpm for 4 minutes, to yield Mixture 1.

Then 0.2 parts by mass of 1-ethynyl-1-cyclohexanol (by Tokyo Chemical Industry Co., Ltd.), which is a curing retarder, dissolved in the same weight of toluene, was added to Mixture 1, to yield Mixture 2.

Next, 0.1 parts by mass of component (c) in the form of a hydrosilylation catalyst (platinum catalyst: mixture of a 1,3-divinyltetramethyldisiloxane platinum complex, 1,3-divinyltetramethyldisiloxane and 2-propanol) was added to Mixture 2, to yield Mixture 3.

There were further weighed 1.1 parts by mass of component (b) in the form of a silicone polymer of linear siloxane skeleton having silicon-bonded active hydrogen groups only in side chains (product name: HMS-301, by Gelest Inc., viscosity 30 $mm^2/s$, hereafter referred to as "SiH"). This component (b) was added to Mixture 3, with thorough mixing, to yield a liquid addition-curable silicone rubber composition. The compounding amount of the thermally-conductive filler (component (d)) relative to the silicone rubber was herein 40 vol %.

(2) Production of a Fixing Belt

Herein a SUS endless belt having an inner diameter of 24 mm, a width of 400 mm and a thickness of 30 μm was prepared as a substrate. The endless belt was handled through insertion of a core into the interior thereof in the course of production steps.

A primer (product name: DY39-051A/B; by Dow Corning Toray Co., Ltd.) was applied substantially uniformly onto the outer peripheral surface of the substrate in such a manner that the dry weight of the primer was 20 mg; after drying of the solvent, the primer was then subjected to a baking treatment for 30 minutes in an electric oven set to 160° C.

The above silicone rubber composition was applied to a thickness of 250 μm, by ring coating, onto the resulting primer-treated substrate. The resulting product is referred to as an uncured endless belt.

Next, corona charging devices having a charging region width of 295 mm were placed facing each other, along the generatrix of the uncured endless belt, and an AC electric field was applied to the surface of the elastic layer prior to curing, while the uncured endless belt was caused to rotate at 100 rpm. The conditions under which corona discharge was carried out included ±150 μA as the current supplied to the discharge wire of the corona charging devices, a grid electrode potential of ±300 V (Vp-p: 600 V), a frequency of 0.025 Hz, a charging time of 160 seconds, and a distance of 3 mm between the grid electrode and the belt.

The charged uncured endless belt was heated in an electric oven at 160° C. for 1 minute (primary curing), and thereafter was heated in an electric oven at 200° C. for 30 minutes (secondary curing), to cure the silicone rubber composition, followed by heating in a vacuum drying oven at 330° C. for 5 minutes, to yield an endless belt provided with an elastic layer.

Next, an addition-curable silicone rubber adhesive (product name: SE1819CV A/B; by Dow Corning Toray Industries, Inc.) was applied substantially uniformly, as an adhesive layer, onto the surface of the cured elastic layer of the endless belt, to a thickness of about 10 μm. A fluororesin tube (product name: NSE; by Gunze Limited) having an inner diameter of 23 mm and a thickness of 20 μm, as a release layer, was overlaid on the belt, while widening the diameter of the tube. Thereafter, the belt surface was uniformly handled from above the fluororesin tube, to thereby remove excess adhesive from between the elastic layer and the fluororesin tube, and thin down the adhesive to about 5 μm.

This endless belt was heated for 1 hour in an electric oven set at 200° C., to cure as a result the adhesive and thereby fix the fluororesin tube onto the elastic layer. Both ends of the obtained endless belt were cut off, to yield a fixing belt having a width of 336.5 mm.

(3) Characteristic Evaluation of the Elastic Layer of the Fixing Belt (3-1) Thermal Conductivity of the Elastic Layer in the Thickness Direction The thermal conductivity, of the elastic layer in the thickness direction was calculated on the basis of the expression below:

$$\lambda = \alpha \times C_p \times \rho$$

In the expression, λ denotes the thermal conductivity (W/(m·K)) of the elastic layer in the thickness direction, a denotes thermal diffusivity ($m^2/s$) in the thickness direction, $C_p$ denotes specific heat at constant pressure (J/(kg·K)), and ρ denotes density ($kg/m^3$). The values of the thermal diffusivity α in the thickness direction, the specific heat at constant pressure $C_p$, and the density ρ, were worked out in accordance with the methods below.

Thermal Diffusivity α

The thermal diffusivity α of the elastic layer in the thickness direction was measured at room temperature (25° C.) using a periodic heating thermophysical property measuring device (product name: FTC-1, by Advance Riko Inc.) A sample piece having a surface area of 8 mm×12 mm was cut out from the elastic layer using a cutter, to produce a total of 5 sample pieces; the thickness of each sample piece was measured using a digital end measuring machine (product name: DIGIMICRO (registered trademark) MF-501 flat probe ϕ4 mm, by Nikon Corporation). Next, each sample piece was measured 5 times in total, and the average value ($m^2/s$) was worked out. The sample piece was measured while being pressed by a weight of 1 kg.

As a result, the thermal diffusivity α of the elastic layer of the silicone rubber in the thickness direction was $9.96\times10^{-7}$ $m^2/s$.

Specific Heat at Constant Pressure $C_p$

The specific heat at constant pressure of the elastic layer was measured using a differential scanning calorimeter (product name: DSC823e, by Mettler-Toledo International Inc.).

Specifically, respective aluminum pans were used as a pan for a sample and a pan for reference. Firstly, as blank measurement, the measurement was performed according to a program the above-described keeping both pans in an empty state, at a constant temperature of 15° C. for 10 minutes, heating then the pans to 215° C. at a ramp rate of 10° C./min, and keeping the pans at a constant temperature of 215° C. for further 10 minutes. A measurement was performed next according to the same program, using 10 mg of synthetic sapphire of known constant-pressure specific heat. Next, 10 mg of the measurement sample, in the same amount as that of the reference-substance synthetic sapphire, was cut out from the elastic layer, was set in a sample pan, and was measured in accordance with the according to the same program. These measurement results were analyzed using the specific heat analysis software ancillary to the above to the above differential scanning calorimeter, and the specific heat at constant pressure $C_p$ at 25° C. was calculated from the average value of the 5 measurement results.

As a result, the specific heat at constant pressure of the elastic layer of the silicone rubber was 1.05 J/(g·K).

Density ρ

The density of the elastic layer was measured with the use of a dry-type automatic densitometer (product name: AccuPyc 1330-01, by Shimadzu Corporation). Specifically, a sample cell of 10 $cm^3$ was used; and a sample piece was cut out from the elastic layer so as to fill up approximately 80% of the cell volume, the mass of the sample piece was measured, and then the sample piece was charged into the sample cell. This sample cell was set in a measurement part in the apparatus; helium was used as a gas for measurement, and then the volume was measured 10 times, after gas purging. The density of the elastic layer was calculated from the mass of the sample piece and the measured volume, for each measurement, to work out the average value.

As a result, the density of the elastic layer of the silicone rubber was 1.53 $g/cm^3$.

The coefficient of thermal conductivity λ of the elastic layer in the thickness direction was calculated from the specific heat at constant pressure $C_p$(J/(kg·K)) and the density ρ ($kg/m^3$) of the elastic layer, of which the units were converted, and from the measured of thermal diffusivity α ($m^2/s$); as a result, the coefficient of thermal conductivity λ was 1.60 W/(m K).

(3-2) Compressive Modulus of the Elastic Layer

The compressive modulus of the elastic layer in the thickness direction was measured using a dynamic viscoelasticity measuring device (product name: Rheogel-E4000, by UBM Co., Ltd.). Specifically, a test piece having an area of 50×50 mm was cut out from the elastic layer using a cutter. This test piece was compression-tested 5 times in the thickness direction of the elastic layer, under conditions that included frequency of 1 Hz, strain of 0.05 mm, and initial strain of 0.02 mm, and the arithmetic mean of the measured values obtained in the tests was worked out. This average value was taken as the compressive modulus of the elastic layer in the thickness direction.

(3-3) Tensile Modulus of the Elastic Layer

Figure 6B:
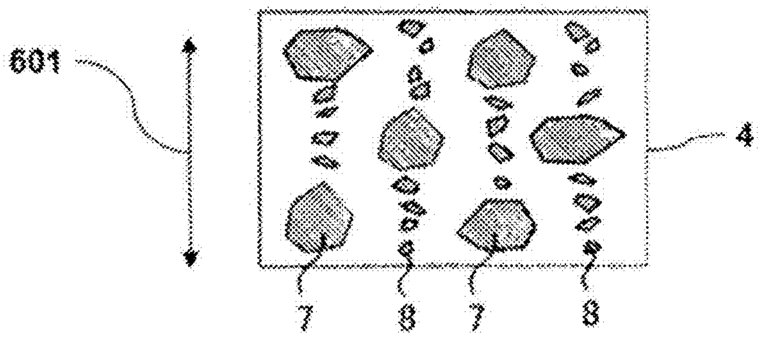

The tensile modulus of the elastic layer was measured in order to check that the elastic layer had low hardness. Specifically, a dumbbell-shaped measurement test piece No. 8 pursuant to Japanese Industrial Standards (JIS) K6251: 2004 was produced from the elastic layer, using a punching die. The longitudinal direction of the test piece was set herein to match a direction (arrow 603 in FIG. 6A) perpendicular to the thickness direction of the elastic layer 4 (arrow 601 in FIG. 6B). Specifically, the longitudinal direction of the test piece (arrow 603 in FIG. 6A), and a direction (direction along the rotation axis) perpendicular to the circumferential direction of the fixing belt, were set to substantially match each other. The thickness in the vicinity of the center, which is the measurement site, was measured. The measurement test piece was tested next, using a tensile tester (equipment name: Strograph EII-L1, produced by Toyo Seiki Seisakusho Ltd.), in a direction perpendicular to the thickness direction of the elastic layer, i.e. in the direction of arrow 603 in FIG. 6A, at room temperature and at a tensile rate of 200 mm/min. Then a graph was created from the measurement results, with the strain of the sample piece on the horizontal axis and tensile stress on the vertical axis; the slope of a linear approximation of measurement data for a strain range of 0 to 10% was taken herein as the tensile modulus.

As a result, the tensile modulus of the elastic layer was 0.15 MPa.

(3-4) Change in Hardness upon Standing of the Elastic Layer in a 240° C. Atmosphere A cuboid sample 50 mm long, 50 mm wide and 150 μm thick that was sampled from the elastic layer using a cutter was allowed to stand for 100 hours in an atmosphere at a temperature of 240° C. and at an oxygen concentration of 1% or lower, and the compressive modulus of the sample in the thickness direction was measured thrice every 10 hours; herein with H10 to H100 as the respective average values of the measurements, the rate of decrease of each of compressive moduli H10 to H100 was measured relative to a compressive modulus H0 at 0 hours as a reference. Specifically, in order to bring the oxygen concentration down to 1% or below, the interior of an oven having a vacuum pump connected thereto was lowered to 0.01 atmosphere or below, followed by injection of an inert gas. In order to suppress oxidation derived from atmosphere exchange upon sample loading and retrieval, each sample was packed in aluminum foil and was loaded/unloaded to/from the oven that way.

(4) Actual Machine Evaluation (Fixing Performance, Durability, Image Quality)

Evaluation of Fixing Performance

Fixing performance was evaluated using a fixing apparatus of fixing belt-pressing roller heating type, illustrated in FIG. 8, having the produced fixing film built therein. The pressing roller was rotationally driven, in a state where the pressure force from one end was about 156.8 N and the total pressure force was about 313.6 N (32 kgf), in such a manner that the movement speed (peripheral speed) of the surface of the pressing roller was 320 mm/see; then a cyan solid image was formed on plain paper (product name: GF-C081, by Canon Inc.) having a basis weight of 81 $g/m^2$ in a state where the surface temperature of the fixing film at a paper-passage portion was controlled to 150 to 180° C.

Specifically, the fixation temperature of the heat fixing apparatus was adjusted, from 150° C. to 160° C., as a standard fixation temperature for the above copier, 5 cyan solid images were formed consecutively, and the image density of the fifth solid image was measured. The toner surface of the solid image was next rubbed three times in the same direction using silbon paper under a load of 4.9 kPa (50 g/cm$^2$) applied thereto, and image density after rubbing was measured. It was determined that toner had become fixed to heavy paper in a case where the rate of decrease in image density before and after rubbing (=[image density difference before and after rubbing/image density before rubbing]×100) was lower than 5%. Results were evaluated according to criteria below. Image density was measured using a reflection densitometer (by Macbeth Corporation).

A: The toner was fixed to paper at a fixation temperature from 150° C. to less than 155° C.

B: The toner was fixed to paper at a fixation temperature from 155° C. to less than 160° C.

C: The toner was fixed to paper at a fixation temperature of 160° C. or higher.

Durability Evaluation

A cyan solid image was continuously formed on A4 size plain paper, with the fixation temperature set to a standard fixation temperature (160° C.), the number of prints at the point in time at which the elastic layer of the fixing belt broke or suffered plastic deformation was recorded, and then durability was evaluated in accordance with the criteria below. In a case where even upon reaching a print count of 740,000 no breakage or plastic deformation had occurred in the elastic layer of the fixing belt, image formation was discontinued thus at 740,000 prints.

A: No breakage or plastic deformation observed in the elastic layer of the fixing belt, even upon image formation on 740,000 prints.

B: No breakage or plastic deformation occurred in the elastic layer of the fixing belt, even upon image formation on 600,000 prints, but breakage or plastic deformation occurred in the elastic layer of the fixing belt upon image formation on 740,000 prints.

C: Breakage or plastic deformation occurred in the elastic layer of the fixing belt as a result of image formation on fewer than 600,000 prints.

Image Quality Evaluation (Melting Unevenness Evaluation)

An index of followability of the fixing member towards paper unevenness can be derived by observing the molten state the toner after fixing the toner image having been formed on the paper.

Using a fixing apparatus 40 of film heating type similar to that of the evaluation of durability there are continuously fixed 10 melting-unevenness evaluation images, in an environment at a temperature of 10° C. and relative humidity of 50%. The paper used herein is A4 size recycled paper (product name: Recycled Paper GF-R100; by Canon Inc., thickness 92 μm, basis weight 66 g/m$^2$, waste paper content 70%, Beck smoothness 23 seconds (method pursuant to JIS P8119)). The melting-unevenness evaluation image is an image in which a 10 mm×10 mm patch image formed of cyan toner and magenta toner at 100% density is disposed in the vicinity of the center of the paper surface.

The yardstick for melting unevenness is herein mixing of colors through toner melting, resulting from sufficient heat and pressure being applied at an image portion in which two colors are formed. In a case in particular where heat, but no pressure, may be applied to depressed portions of the paper relief, residual grain boundaries of the toner persist after fixing, and melting unevenness occurs as a result in a state where color mixing has not been sufficiently brought about. In a case where the fixing member cannot sufficiently conform to paper unevenness, color mixing takes place at protruded portions acted upon by pressure, but is however insufficient at depressed portions. Therefore, unevenness followability was ascertained by observing the molten state in image formation areas.

After printing of 10 consecutive evaluation images of melting unevenness, the 10th sample was retrieved, and the image formation area was observed under an optical microscope, to evaluate melting unevenness. The evaluation criteria are as follows.

Evaluation Criteria

A: Toner grain boundaries are not visible at all, even in depressed portions of the paper fibers; colors are mixed in both protruded and depressed portions.

B: Some toner grain boundaries are observable in depressed portions of the paper fibers, but mostly with color mixing in both protruded and depressed portions.

C: Color mixing only at protruded portions of the paper fibers, with numerous toner grain boundaries observable at depressed portions.

Example 2

A fixing belt was produced and evaluated in the same way as in Example 1, but herein the electric field orientation time was set to 10 seconds.

Example 3

A fixing belt was produced and evaluated in the same way as in Example 1, but herein with heating for 30 minutes (secondary curing) in an electric oven at 200° C. during formation of the elastic layer, to cure the silicone rubber composition, and further with 280° C. as the temperature at the time of a high-temperature heating treatment that was performed thereafter.

Example 4

A fixing belt was produced and evaluated in the same way as in Example 1, but herein adding 103 parts by mass of large-diameter metallic silicon (product name: #350, by Kinsei Matec Co., Ltd.) and 62 parts by mass of small-diameter metallic silicon (product name: FINE, by Kinsei Matec Co., Ltd.).

Example 5

A fixing belt was produced and evaluated in the same way as in Example 1, but herein adding 177 parts by mass of large-diameter metallic silicon (product name: #350, by Kinsei Matec Co., Ltd.) and 12 parts by mass of small-diameter metallic silicon (product name: FINE, by Kinsei Matec Co., Ltd.).

Comparative Example 1

A fixing belt was produced and evaluated in the same way as in Example 1, but herein the amount of crosslinking agent (SiH) was set to 1.4 parts.

Comparative Example 2

A fixing belt was produced and evaluated in the same way as in Example 1, but herein an electric field orientation treatment was not performed.

Comparative Example 3

A fixing belt was produced and evaluated in the same way as in Example 1, but herein with heating for 30 minutes (secondary curing) in an electric oven at 200° C. during formation of the elastic layer, to cure the silicone rubber composition, after which no high-temperature heating treatment was performed.

The above results are given in Tables 1 and 2.

TABLE 1

| | Elastic layer | | | | | | | |
|---|---|---|---|---|---|---|---|---|
| | Electric field orientation — | Heating treatment — | λ W/mK | Large particle size area ratio % | Small particle size area ratio % | Total % | Large particle size arrangement degree fL | Small particle arrangement degree fs |
| Example 1 | Yes | 330° C. 5 min | 1.60 | 30 | 10 | 40 | 0.15 | 0.45 |
| Example 2 | Yes | 330° C. 5 min | 1.31 | 30 | 10 | 40 | 0.15 | 0.20 |
| Example 3 | Yes | 280° C. 5 min | 1.45 | 30 | 10 | 40 | 0.15 | 0.30 |
| Example 4 | Yes | 330° C. 5 min | 1.30 | 15 | 25 | 40 | 0.15 | 0.45 |
| Example 5 | Yes | 330° C. 5 min | 1.48 | 43 | 3 | 46 | 0.15 | 0.30 |
| Comparative Example 1 | Yes | 330° C. 5 min | 1.59 | 30 | 10 | 40 | 0.15 | 0.45 |
| Comparative Example 2 | No | 330° C. 5 min | 1.03 | 30 | 10 | 40 | 0.10 | 0.15 |
| Comparative Example 3 | Yes | No | 1.41 | 30 | 10 | 40 | 0.15 | 0.45 |

| | Elastic layer | | | | | |
|---|---|---|---|---|---|---|
| | Small particle size arrangement angle Φs(°) | Tensile modulus MPa | Compressive modulus MPa | Tensile modulus/ Compressive modulus — | D3-05 total generation amount ppm | T units/ D units — |
| Example 1 | 80 | 0.20 | 0.50 | 0.40 | 2.0 | 0.043 |
| Example 2 | 60 | 0.15 | 0.19 | 0.78 | 2.1 | 0.032 |
| Example 3 | 68 | 0.19 | 0.35 | 0.55 | 1.7 | 0.028 |
| Example 4 | 81 | 0.17 | 0.85 | 0.20 | 2.0 | 0.042 |
| Example 5 | 80 | 0.17 | 0.24 | 0.70 | 1.9 | 0.041 |
| Comparative Example 1 | 80 | 0.25 | 0.60 | 0.42 | 1.7 | 0.043 |
| Comparative Example 2 | 30 | 0.14 | 0.16 | 0.90 | 2.0 | 0.031 |
| Comparative Example 3 | 80 | 0.18 | 0.30 | 0.60 | 0.8 | 0.013 |

TABLE 2

| | Hardness change | | | | | | | | | | | Evaluation rank | | |
|---|---|---|---|---|---|---|---|---|---|---|---|---|---|---|
| | H0 % | H10 % | H20 % | H30 % | H40 % | H50 % | H60 % | H70 % | H80 % | H90 % | H100 % | Fixing performance | Durability | Melting unevenness |
| Example 1 | — | 2 | 1 | 0 | −1 | 0 | 1 | 0 | 0 | 0 | −1 | A | A | B |
| Example 2 | — | 3 | 3 | 2 | 1 | 0 | 0 | 0 | −1 | −1 | −4 | B | A | A |
| Example 3 | — | 3 | 3 | 2 | 0 | 1 | 0 | −1 | −2 | −4 | −8 | B | B | B |
| Example 4 | | 2 | 1 | 0 | −1 | 0 | 0 | 0 | 0 | −1 | −1 | B | A | A |
| Example 5 | | 2 | 2 | 0 | −1 | 0 | 0 | 0 | 0 | −1 | −1 | B | B | B |
| Comparative Example 1 | — | 1 | 1 | 0 | 1 | 0 | 0 | 0 | −1 | −1 | −1 | A | A | C |
| Comparative Example 2 | — | 1 | 2 | 2 | 1 | 0 | 0 | −1 | −2 | −3 | −3 | C | A | A |
| Comparative Example 3 | — | 10 | 15 | 12 | 10 | 9 | 6 | 5 | 4 | 0 | 1 | B | C | B |

In Tables 1 and 2, the values of "Hardness change" illustrate the results of change in hardness changes when the elastic layer is allowed to stand in an atmosphere at 240° C., and denote a rate of decrease of values of compressive moduli H10 to H100 every 10 hours, relative to a value of compressive modulus H0 at 0 hours. A negative value of rate of decrease signifies an increase in compressive modulus with respect to H0.

Good results of A or B in fixing performance, durability, and image quality were obtained in all the examples. The lower the tensile modulus, the better the image quality is; also, the lower the ratio of tensile modulus/compressive modulus, the higher becomes the thermal conductivity and the better becomes the fixing performance In the comparative examples, by contrast, a result of rank C was obtained in any of the fixing performance, durability and image quality items.

As explained above, the present disclosure can be used as an electrophotographic member that affords a low hardness state while ensuring thermal conductivity and durability, in the thickness direction, of an elastic layer of a fixing member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-121745, filed Jul. 26, 2023, which is hereby incorporated by reference herein in its entirety.

What is claimed is:

1. An electrophotographic member comprising:
a substrate, and
an elastic layer on an outer peripheral surface of the substrate; wherein
the elastic layer comprises silicone rubber,
a tensile modulus of the elastic layer in a direction perpendicular to a thickness direction thereof is 0.20 MPa or less,
a compressive modulus of the elastic layer in the thickness direction is 0.19 to 0.57 MPa,
a value (tensile modulus/compressive modulus) of a ratio of the tensile modulus of the elastic layer in the direction perpendicular to the thickness direction, relative to the compressive modulus of the elastic layer in the thickness direction, is 0.80 or lower, and
with compressive moduli H0 to H100 as respective values of compressive modulus of a cuboid sample 50 mm long, 50 mm wide and 150 μm thick that is sampled from the elastic layer, in a direction corresponding to the thickness direction of the elastic layer, every 10 hours, up to 100 hours, in an atmosphere at a temperature of 240° C. and at an oxygen concentration of 1% or lower, a rate of decrease of each of the compressive moduli H10 to H100, relative to a compressive modulus H0 as a reference, is 5% or lower.

2. The electrophotographic member according to claim 1, wherein the silicone rubber comprises a cured product of an addition-curable silicone rubber composition.

3. The electrophotographic member according to claim 1, wherein a value (T unit/D unit) of a ratio of an integration value of a peak corresponding to a T unit, relative to an integration value of a peak corresponding to a D unit, in a chart obtained in an $^{29}$Si-NMR measurement using the elastic layer as a sample, is 0.030 or higher.

4. The electrophotographic member according to claim 1, wherein a total generation amount of hexamethylcyclotrisiloxane, octamethylcyclotetrasiloxane and decamethylcyclopentasiloxane, upon heating of the silicone rubber at 150° C. for 1 hour, is 1.5 ppm or larger.

5. The electrophotographic member according to claim 1, wherein the elastic layer comprises a filler, and the filler content in the elastic layer is from 30 to less than 50 vol %, relative to the silicone rubber.

6. The electrophotographic member according to claim 5, wherein
with binarized images having a size of 150 μm×100 μm as obtained at 5 sites in a first cross section of the elastic layer in thickness-circumferential directions, and with binarized images having a size of 150 μm×100 μm as obtained at 5 sites in a second cross section of the elastic layer in thickness-axial directions, an average value of area ratios of large particle filler having a circle-equivalent diameter of 5 μm or larger, in the total 10 binarized images, is 20 to 40%,
an average arrangement degree fL of the large particle filler is 0.00 to 0.15,
an average value of an area ratio of a small particle filler having a circle-equivalent diameter smaller than 5 μm, in the binarized images, is 10 to 20%,
an average arrangement degree fS of the small particle filler is 0.20 to 0.50, and
an average arrangement angle ΦS of the small particle filler is 60 to 120°.

7. The electrophotographic member according to claim 1, wherein the electrophotographic member is a fixing member having an endless shape.

8. The electrophotographic member according to claim 1, wherein the electrophotographic member is a pressing member having an endless shape.

9. A heat fixing apparatus in an electrophotographic image forming apparatus, the heat fixing apparatus comprising:
a fixing member and a pressing member disposed opposite the fixing member,
wherein at least one selected from the group consisting of the fixing member and the pressing member is the electrophotographic member according to claim 1.

10. An electrophotographic image forming apparatus comprising a heat fixing apparatus, wherein
the heat fixing apparatus comprises a fixing member and a pressing member disposed opposite the fixing member, and at least one selected from the group consisting of the fixing member and the pressing member is the electrophotographic member according to claim 1.

* * * * *